US012546454B2

(12) United States Patent
Siebenaller et al.

(10) Patent No.: US 12,546,454 B2
(45) Date of Patent: Feb. 10, 2026

(54) LIGHTED ARCHITECTURAL-STRUCTURE COVERING

(71) Applicant: Hunter Douglas Inc., New York, NY (US)

(72) Inventors: Michael J. Siebenaller, Broomfield, CO (US); Coty Church, Westminster, CO (US); Kevin M. Dann, Englewood, CO (US); Christopher M. White, Frederick, CO (US)

(73) Assignee: Hunter Douglas Inc., New York, NY (US)

( * ) Notice: Subject to any disclaimer, the term of this patent is extended or adjusted under 35 U.S.C. 154(b) by 0 days.

(21) Appl. No.: 19/010,636

(22) Filed: Jan. 6, 2025

(65) Prior Publication Data

US 2025/0137614 A1 May 1, 2025

Related U.S. Application Data

(63) Continuation of application No. 18/632,578, filed on Apr. 11, 2024, now Pat. No. 12,222,099, which is a
(Continued)

(51) Int. Cl.
*F21V 7/00* (2006.01)
*F21K 9/275* (2016.01)
(Continued)

(52) U.S. Cl.
CPC ............ *F21V 7/0025* (2013.01); *F21K 9/275* (2016.08); *F21K 9/68* (2016.08); *F21V 3/06* (2018.02);
(Continued)

(58) Field of Classification Search
CPC ........ F21V 7/0025; F21V 3/06; F21V 19/005; F21V 7/00; F21V 33/006; F21V 14/006;
(Continued)

(56) References Cited

U.S. PATENT DOCUMENTS

| | | | |
|---|---|---|---|
| 4,514,725 | A | 4/1985 | Bristley |
| 5,148,849 | A | 9/1992 | Faludy |

(Continued)

FOREIGN PATENT DOCUMENTS

| | | | |
|---|---|---|---|
| CN | 201767722 | U | 3/2011 |
| CN | 102770617 | A | 11/2012 |

(Continued)

OTHER PUBLICATIONS

International Search Report and Written Opinion for the International Patent Application No. PCT/US2020/054711, mailed Jan. 29, 2021, 14 pages.

(Continued)

*Primary Examiner* — Evan P Dzierzynski
(74) *Attorney, Agent, or Firm* — Dority & Manning, P.A.

(57) ABSTRACT

A lighted architectural-structure covering is disclosed. In one example of an embodiment, an architectural-structure covering includes a light source arranged and configured to illuminate at least a portion of the architectural-structure covering. The architectural-structure covering may include first and second coverings. The light source is arranged and configured to direct light onto the second covering, which is arranged and configured to reflect, redistribute, etc. the received light toward the interior space of the room in which the architectural-structure covering is located. Thus arranged, the architectural-structure covering may be used to create, for example, diffused-lighting effects.

20 Claims, 19 Drawing Sheets

Related U.S. Application Data continuation of application No. 17/768,027, filed as application No. PCT/US2020/054711 on Oct. 8, 2020, now Pat. No. 12,007,111.

(60) Provisional application No. 63/024,736, filed on May 14, 2020, provisional application No. 62/916,911, filed on Oct. 18, 2019.

(51) Int. Cl.

| | |
|---|---|
| ***F21K 9/68*** | (2016.01) |
| ***F21V 3/06*** | (2018.01) |
| ***F21V 19/00*** | (2006.01) |
| *F21Y 115/10* | (2016.01) |

(52) U.S. Cl.

CPC ......... *F21V 19/005* (2013.01); *F21Y 2115/10* (2016.08)

(58) Field of Classification Search

CPC ...... F21V 14/04; F21V 33/0016; F21K 9/275; F21K 9/68; F21Y 2115/10; E06B 2009/2452; E06B 2009/247; E06B 2009/2622; E06B 9/40; E06B 9/262; E06B 2009/2627; E06B 9/24; E06B 2009/2417

See application file for complete search history.

(56) References Cited

U.S. PATENT DOCUMENTS

| | | | | |
|---|---|---|---|---|
| 5,412,553 | A | 5/1995 | Wojski | |
| 5,426,879 | A | 6/1995 | Hecker | |
| 5,467,266 | A | 11/1995 | Jacobs et al. | |
| 6,601,634 | B2 | 8/2003 | Weidenbach | |
| 6,666,251 | B2 | 12/2003 | Ikle | |
| 6,877,548 | B1 | 4/2005 | Chartier et al. | |
| 6,966,673 | B1 | 11/2005 | Oyama | |
| 7,617,857 | B2 | 11/2009 | Froese | |
| 8,104,921 | B2 | 1/2012 | Hente et al. | |
| 8,193,742 | B2 | 6/2012 | Skinner et al. | |
| 8,243,359 | B2 | 8/2012 | De Ruijter et al. | |
| 8,330,882 | B2 | 12/2012 | Lee et al. | |
| 8,339,085 | B2 | 12/2012 | Feldstein et al. | |
| 8,403,516 | B2 | 3/2013 | Chang | |
| 8,471,464 | B2 | 6/2013 | Yamada et al. | |
| 8,814,374 | B2 | 8/2014 | Van Der Poel et al. | |
| 8,820,386 | B2 * | 9/2014 | Mullet | E06B 9/40 160/241 |
| 8,820,970 | B2 | 9/2014 | Nicole | |
| 8,950,460 | B2 | 2/2015 | Worthman et al. | |
| 9,116,276 | B2 | 8/2015 | Montfort et al. | |
| 9,169,690 | B2 | 10/2015 | Blair | |
| 9,192,243 | B2 | 11/2015 | Slaughter | |
| 9,328,906 | B1 | 5/2016 | Bennington | |
| 9,371,983 | B2 | 6/2016 | Engelen et al. | |
| 9,512,672 | B2 * | 12/2016 | Colson | E06B 9/264 |
| 9,567,802 | B2 * | 2/2017 | Buccola, Jr. | E06B 9/322 |
| 9,568,799 | B2 | 2/2017 | Lam et al. | |
| 9,598,899 | B2 | 3/2017 | Spanjaard | |
| 9,650,831 | B2 | 5/2017 | Birru et al. | |
| 9,725,947 | B2 | 8/2017 | Seehof | |
| 9,857,657 | B2 | 1/2018 | Ash et al. | |
| 10,048,560 | B1 | 8/2018 | Mazuir et al. | |
| 10,202,073 | B2 | 2/2019 | Schuett et al. | |
| 10,234,104 | B2 | 3/2019 | Maas | |
| 10,781,630 | B2 | 9/2020 | Buccola, Jr. et al. | |
| 2006/0152137 | A1 | 7/2006 | Beteille et al. | |
| 2008/0041533 | A1 | 2/2008 | Ziegler | |
| 2008/0271856 | A1 | 11/2008 | Paulussen et al. | |
| 2009/0059574 | A1 | 3/2009 | Lewis et al. | |
| 2010/0118521 | A1 | 5/2010 | Jacobs et al. | |
| 2010/0302772 | A1 | 12/2010 | Lin | |
| 2011/0126992 | A1 | 6/2011 | Yordanova | |
| 2011/0192551 | A1 | 8/2011 | Rance | |
| 2011/0253319 | A1 | 10/2011 | Schaupp | |
| 2012/0069599 | A1 | 3/2012 | Cornelissen et al. | |
| 2012/0193039 | A1 | 8/2012 | Scolari | |
| 2012/0275158 | A1 | 11/2012 | Yeh | |
| 2012/0291964 | A1 | 11/2012 | Marocco | |
| 2012/0299470 | A1 | 11/2012 | Kobayashi et al. | |
| 2013/0306250 | A1 | 11/2013 | Mullet et al. | |
| 2014/0166218 | A1 | 6/2014 | Ng | |
| 2014/0202643 | A1 | 7/2014 | Hikmet et al. | |
| 2014/0262068 | A1 | 9/2014 | Buccola, Jr. et al. | |
| 2015/0092400 | A1 | 4/2015 | Vincenzi | |
| 2015/0354272 | A1 | 12/2015 | Vasylyev | |
| 2015/0376941 | A1 | 12/2015 | Fujita et al. | |
| 2016/0002974 | A1 | 1/2016 | Boyle | |
| 2016/0034036 | A1 | 2/2016 | Ahmed et al. | |
| 2016/0102824 | A1 | 4/2016 | Torres et al. | |
| 2017/0082259 | A1 | 3/2017 | Riethmuller et al. | |
| 2017/0183906 | A1 | 6/2017 | Vasylyev | |
| 2018/0023338 | A1 | 1/2018 | Werner | |
| 2018/0222166 | A1 | 8/2018 | Swiszez et al. | |
| 2019/0032404 | A1 | 1/2019 | Chacon et al. | |
| 2019/0048656 | A1 | 2/2019 | Combee | |
| 2020/0080367 | A1 * | 3/2020 | Daugaard | A47H 1/13 |
| 2022/0049546 | A1 | 2/2022 | Daugaard | |

FOREIGN PATENT DOCUMENTS

| | | | | |
|---|---|---|---|---|
| CN | 107404782 | A | 11/2017 | |
| DE | 8129371 | U1 | 1/1982 | |
| DE | 19855166 | A1 | 6/1999 | |
| DE | 29918618 | U1 | 2/2000 | |
| DE | 10016587 | A1 | 10/2001 | |
| DE | 202004013324 | U1 | 11/2004 | |
| DE | 10344213 | A1 | 7/2005 | |
| DE | 102004041224 | A1 | 3/2006 | |
| DE | 102005032657 | A1 | 2/2007 | |
| DE | 102008021273 | A1 | 11/2008 | |
| DE | 202009009668 | U1 | 10/2009 | |
| DE | 202010008886 | U1 | 1/2011 | |
| DE | 102009032988 | A1 | 2/2011 | |
| DE | 102010044810 | A1 | 3/2012 | |
| DE | 202012001862 | U1 | 5/2012 | |
| DE | 202012006377 | U1 | 9/2012 | |
| DE | 202014005655 | U1 | 8/2014 | |
| DE | 102013017904 | A1 | 4/2015 | |
| DE | 102014010278 | A1 | 10/2015 | |
| DE | 202016004154 | U1 | 7/2016 | |
| DE | 202015105349 | U1 | 11/2016 | |
| EP | 1052364 | A1 * | 11/2000 | E06B 9/40 |
| EP | 2199484 | A2 | 6/2010 | |
| EP | 2455576 | A1 | 5/2012 | |
| FR | 2847615 | A1 | 5/2004 | |
| FR | 2938289 | A1 | 5/2010 | |
| JP | S60136422 | U | 9/1985 | |
| JP | H06108762 | A | 4/1994 | |
| JP | H0639038 | Y2 | 10/1994 | |
| JP | 2001082058 | A | 3/2001 | |
| JP | 2003149410 | A | 5/2003 | |
| JP | 2006184561 | A | 7/2006 | |
| JP | 2016018665 | A | 2/2016 | |
| JP | 2017040889 | A | 2/2017 | |
| JP | 2018168611 | A | 11/2018 | |
| KR | 200389457 | Y1 | 7/2005 | |
| KR | 100770971 | B1 | 10/2007 | |
| KR | 20100012311 | A | 2/2010 | |
| KR | 20100020318 | A | 2/2010 | |
| KR | 20110127401 | A | 11/2011 | |
| KR | 20140001562 | U | 1/2014 | |
| KR | 20140100220 | A | 8/2014 | |
| KR | 20170000984 | A | 1/2017 | |
| KR | 20170023447 | A | 3/2017 | |
| KR | 20170071666 | A | 6/2017 | |
| KR | 20170124193 | A | 11/2017 | |
| WO | 2008129186 | A2 | 10/2008 | |
| WO | 200934594 | A1 | 3/2009 | |
| WO | 2009156885 | A1 | 12/2009 | |
| WO | 201124143 | A1 | 3/2011 | |
| WO | 201127296 | A1 | 3/2011 | |

(56) References Cited

FOREIGN PATENT DOCUMENTS

| | | | |
|---|---|---|---|
| WO | 201195754 | A1 | 8/2011 |
| WO | 201284822 | A2 | 6/2012 |
| WO | 201413990 | A1 | 1/2014 |
| WO | 201441617 | A1 | 3/2014 |
| WO | 201494081 | A2 | 6/2014 |
| WO | 2019046838 | A1 | 3/2019 |
| WO | 2020055805 | A1 | 3/2020 |

OTHER PUBLICATIONS

International Search Report and Written Opinion for the International Patent Application No. PCT/US2021/023587, mailed Jan. 4, 2022.
Translation of Giesche Tueren & Fenster, DE 812937, published Sep. 1981 (Year: 1981).
Japanese Notice of Allowance, Japanese Application 2022-522039, mailing date of May 22, 2025, 3 pgs.

* cited by examiner

LIGHTED ARCHITECTURAL-STRUCTURE COVERING

CROSS-REFERENCE TO RELATED APPLICATIONS

This application is a continuation of U.S. patent application Ser. No. 18/632,578, filed Apr. 11, 2024, which application is a continuation of U.S. patent application Ser. No. 17/768,027, filed Apr. 11, 2022, now U.S. Pat. No. 12,007,111, which application is a National Phase filing of International Application No. PCT/US2020/054711, filed Oct. 8, 2020, which application makes reference to and claims the benefit of the filing date of U.S. provisional patent application No. 62/916,911, filed Oct. 18, 2019, entitled "Lighted Architectural-Structure Covering," and makes reference to and claims the benefit of the filing date of U.S. provisional patent application No. 63/024,736, filed May 14, 2020, entitled "Lighted Architectural-Structure Covering," each of which application is incorporated by reference herein in its entirety.

FIELD OF THE DISCLOSURE

The present disclosure relates generally to architectural-structure coverings, and more particularly to an architectural-structure covering that includes a light source arranged and configured to illuminate a covering portion of the architectural-structure covering.

BACKGROUND OF THE DISCLOSURE

Architectural-structure coverings for architectural openings and/or structures, such as windows, doors, archways, portions of a wall, and the like (collectively an architectural structure without the intent to limit), have taken numerous forms for many years. One known architectural-structure covering includes a covering or covering portion (used interchangeably herein without the intent to limit) such as a fabric that is movable between an extended position and a retracted position. For example, the covering can be moved between an extended position and a retracted position for obscuring and exposing the underlying architectural structure.

To move the covering between the extended and retracted positions, some architectural-structure coverings include a rotatable member (e.g., a rod or a roller). Rotation of the rotatable member in a first direction may retract the covering while rotation of the rotatable member in a second, opposite direction may extend the covering. The covering of the architectural-structure covering may be gathered or stacked adjacent to, or wrapped around, the rotatable member. For example, some retractable coverings include a plurality of folds that are raised or lowered as lift cords are wrapped about or unwrapped from the rotatable member. The lift cords may be coupled to the rotatable member, pass through or along the covering, and may be coupled to, for example, a bottom rail. Thereafter, rotation of the rotatable member in a first direction wraps the lift cords about the rotatable member causing the covering to retract adjacent to the rotatable member while rotation in a second direction causes the lift cords to unwrap about the rotatable member causing the covering to move in an extended configuration. Alternatively, in various embodiments, the covering may be wrapped around the rotatable member in the retracted position. For example, some retractable coverings include a flexible covering suspended from the rotatable member. The covering can either be wrapped about the rotatable member to retract the covering or unwrapped from the rotatable member to extend the covering. Regardless of the form of the covering, rotation of the rotatable member generally causes movement of the covering of the architectural-structure covering.

The architectural-structure covering may also include an operating system to, for example, actuate movement of the rotatable member, and thus the covering of the architectural-structure covering. The operating system may be any suitable operating system now known or hereafter developed. For example, in some embodiments, the operating system is operatively associated with an operating element such as, for example, a cord, a chain, a tilt wand, or the like. The operating element may be manipulated by a human operator to move the covering between the extended and retracted positions. Alternatively, the operating system may include a motorized controller to lower or raise the covering. For example, a motorized drive motor (e.g., an electric motor) can be provided to move the covering between the extended position and the retracted position. In one embodiment, the operating element may include a hand-held remote or the like. In alternate embodiments, the covering may be moved by gripping and manipulating the bottom rail of the architectural-structure covering.

Use of architectural-structure coverings in, for example, homes, restaurants, businesses, and other buildings has become prevalent. During evening hours and/or during, for example, hosting events, it may be beneficial to employ the architectural-structure covering to provide one or more aesthetic effects. For example, it would be beneficial to enable the architectural-structure coverings to be illuminated, to provide lighting such as, for example, diffused-lighting effects, mood lighting, etc.

It is with respect to these and other considerations that the features and/or aspects of the present disclosure may be useful.

SUMMARY

This Summary is provided to introduce in a simplified form, a selection of concepts that are further described below in the Detailed Description. This Summary is not intended to identify key features or essential features of the claimed subject matter, nor is it intended as an aid in determining the scope of the claimed subject matter.

Disclosed herein is a lighted architectural-structure covering. The architectural-structure covering may include a first covering movable between an extended position and a retracted position, a second covering movable between an extended position and a retracted position, and a light source for emitting light onto at least a portion of the architectural-structure covering.

In one example of an embodiment, the light source is arranged and configured to direct light onto the second covering, which is arranged and configured to reflect, redistribute, etc. the received light towards an interior space of a room in which the architectural-structure covering is located.

Additionally, and/or alternatively, in one example embodiment, the architectural-structure covering may also include a reflector on which light is directed, shone, received, etc. from the light source and for directing the light towards the second, reflective covering. The reflector including a reflective surface positioned adjacent to the light source for directing the received light towards the second, reflective covering. The reflector may be positioned within a headrail.

Additionally, and/or alternatively, in one example embodiment, the first and second coverings are separately and independently movable between their respective extended and retracted positions so that a position of the first and second coverings are separately and independently positionable.

Additionally, and/or alternatively, in one example embodiment, the first and second coverings are arranged and configured to move in unison (e.g., simultaneously at the same time and/or to the same extent).

Additionally, and/or alternatively, in one example embodiment, the architectural-structure covering is arranged and configured to distribute light across a cross-sectional area of an exposed portion of said second, reflective covering. That is, when the second, reflective covering is partially extended, the light source is arranged and configured to illuminate only the partially exposed portion of the second, reflective covering. Thus arranged, the architectural-structure covering is arranged and configured to enable a user to view portions of an underlying structure not covered by said first and second coverings.

Figure 1:
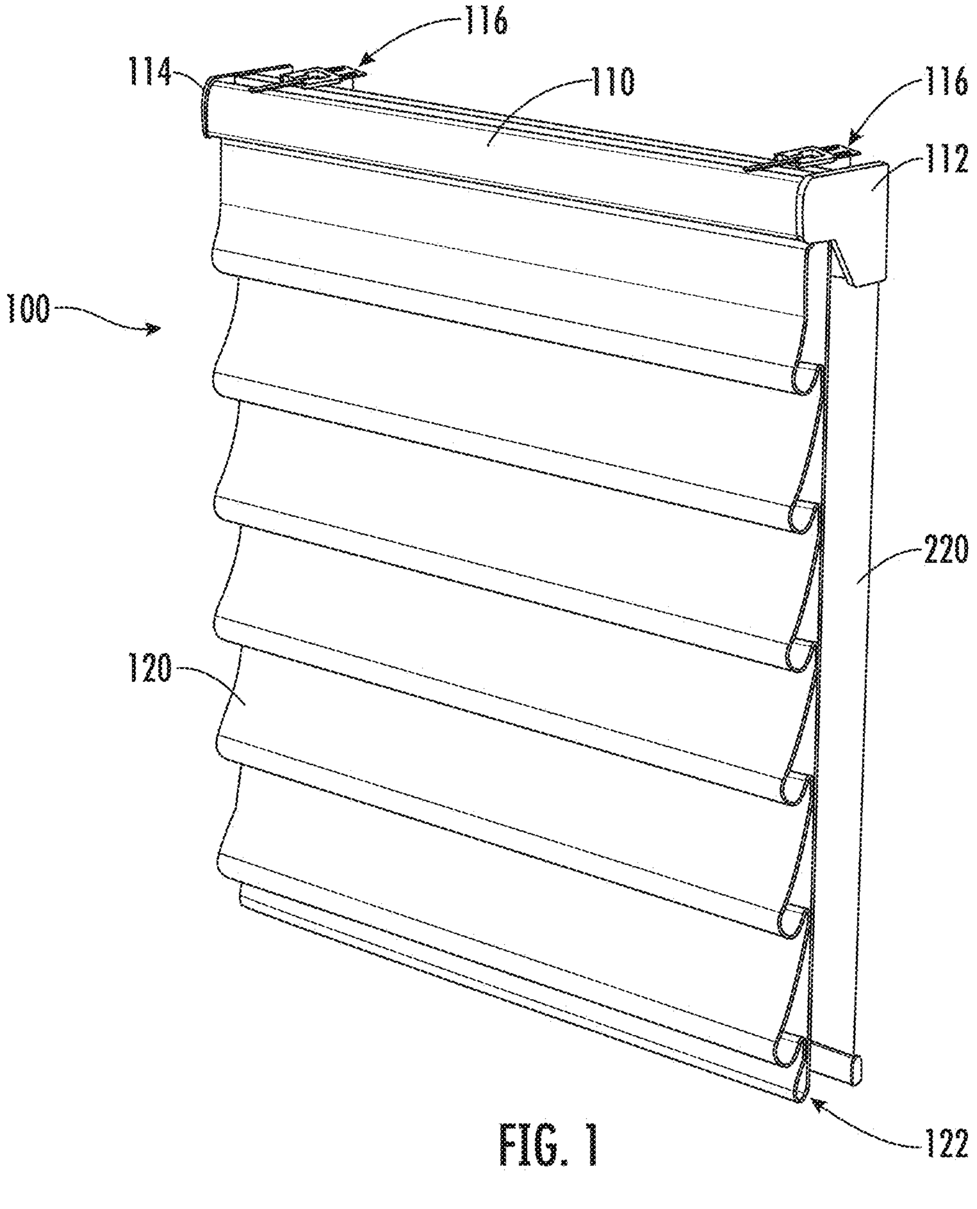
FIG. 1 is a front, perspective view illustrating an example of an embodiment of an architectural-structure covering in accordance with one or more aspects of the present disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

Various features, aspects, or the like of an architectural-structure covering including a light source will now be described more fully hereinafter with reference to the accompanying drawings, in which one or more aspects of the architectural-structure covering will be shown and described. It should be appreciated that the various features, aspects, or the like may be used independently of, or in combination, with each other. It will be appreciated that the architectural-structure covering as disclosed herein may be embodied in many different forms and should not be construed as being limited to the embodiments set forth herein. Rather, these embodiments are provided so that this disclosure will convey certain illustrations of aspects of the architectural-structure covering to those skilled in the art. In the drawings, like numbers refer to like elements throughout unless otherwise noted.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

As will be described in greater detail below, an architectural-structure covering according to the present disclosure may include a light source arranged and configured to illuminate at least a portion of the architectural-structure covering. In accordance with one aspect of the present disclosure, the light source may be arranged and configured to direct light onto a second covering, which may be arranged and configured to reflect the received light.

Referring to FIG. 1, an example of an embodiment of an architectural-structure covering 100 in accordance with the present disclosure is illustrated. The architectural-structure covering 100 may include a first covering 120 movable between an extended position and a retracted position (illustratively, the position shown in FIG. 1). For example, as illustratively shown in FIG. 1, the covering 120 can be vertically extendable or retractable (e.g., able to be lowered or raised, respectively, in a vertical direction) between the extended position and the retracted position for obscuring and exposing the underlying architectural structure.

As illustrated, the architectural-structure covering 100 may also include a headrail 110, which in the illustrated example of an embodiment is a housing having opposed end caps 112, 114 joined by front, back, and top sides to form an open bottom enclosure. The headrail 110 may also include any suitable mounting structure 116 for coupling the headrail 110 to a structure above, or at the top of, an architectural structure, such as a wall, via mechanical fasteners such as screws, bolts, or the like. Although a particular example of a headrail 110 is shown in FIG. 1, many different types and styles of headrails exist and could be employed in place of the example headrail of FIG. 1.

Figure 3:
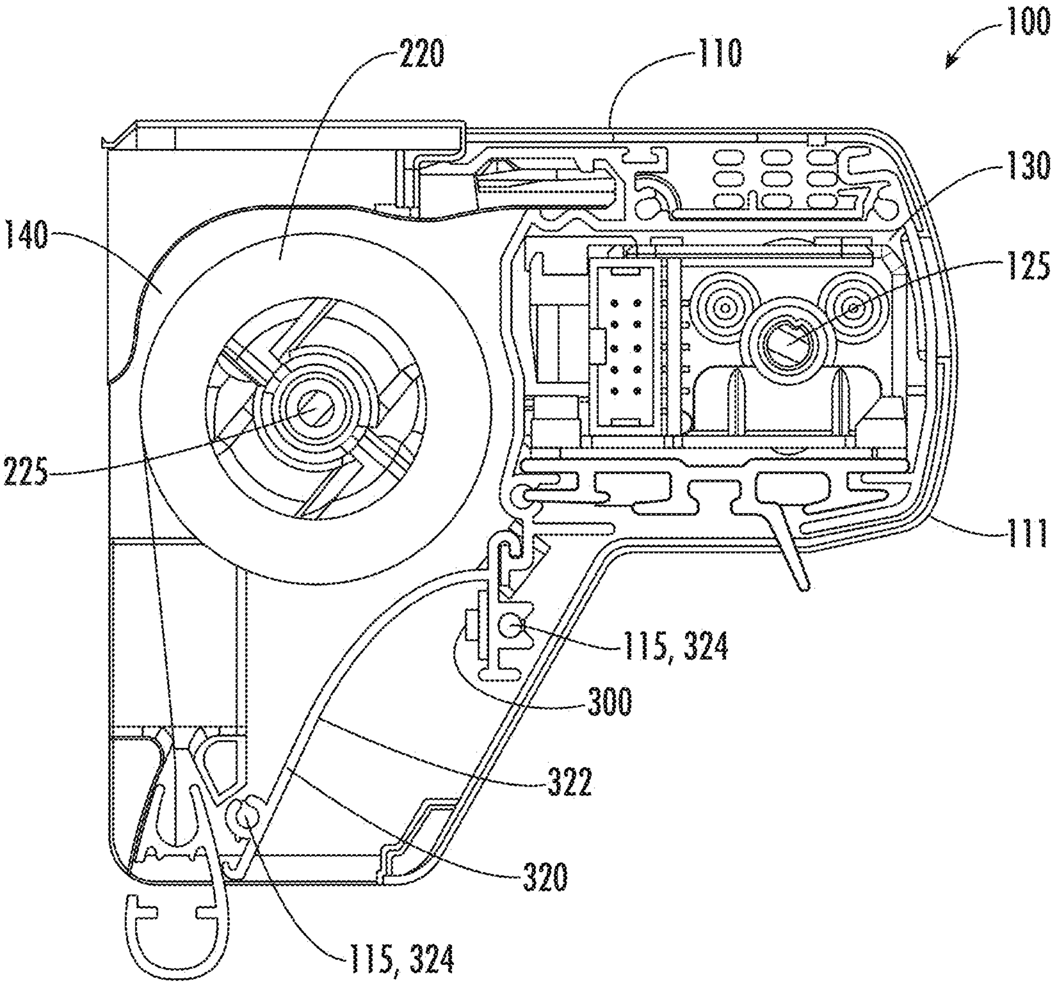
FIG. 3 is a cross-sectional view of the headrail shown in FIG. 2, the headrail shown with a second covering in a fully retracted position in accordance with one aspect of the present disclosure.
Figure 4:
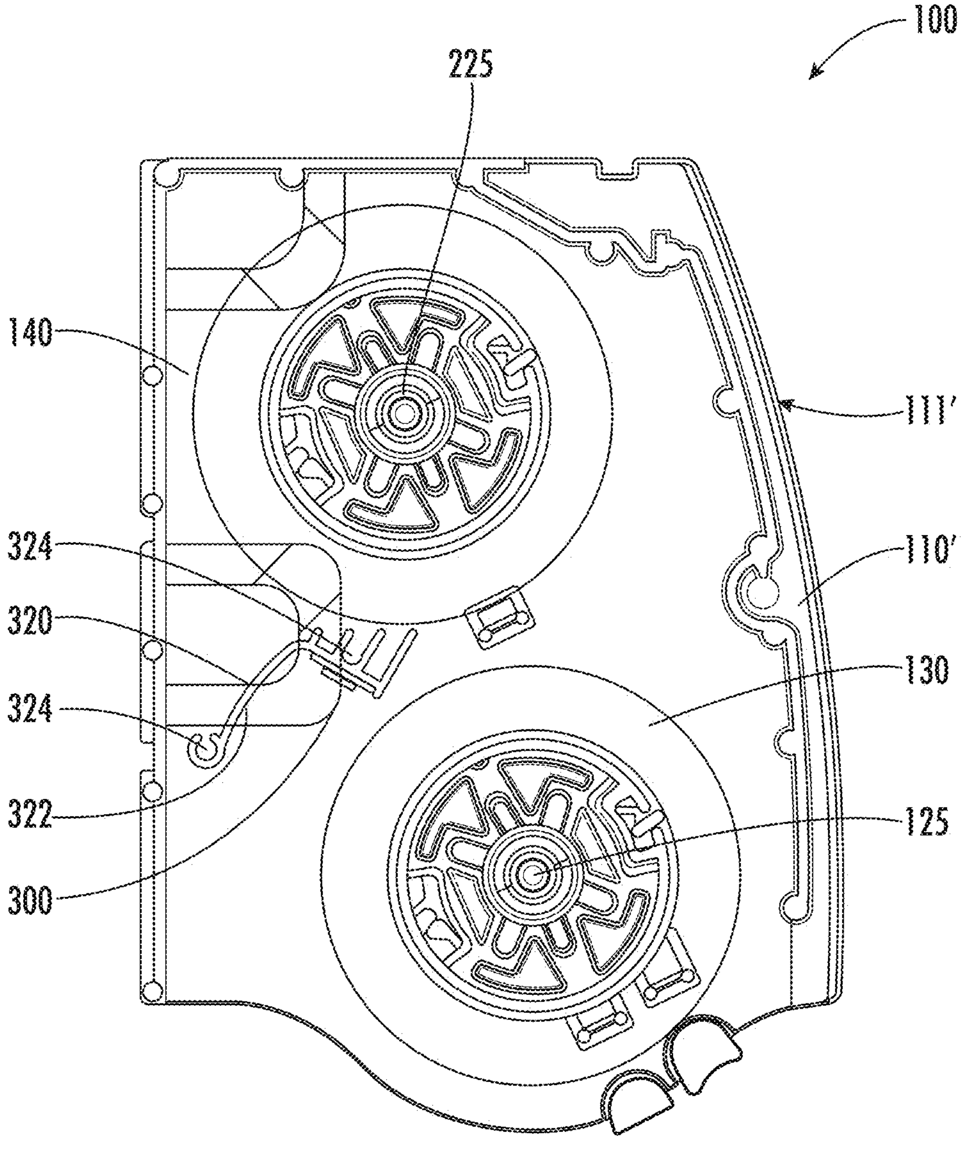
FIG. 4 is a cross-sectional view of an alternate example of an embodiment of a headrail that may be used in connection with the architectural-structure covering of FIG. 1.

In use, the first covering 120 may be operatively associated with an operating system and/or an operating element to actuate movement of the first covering 120 between the extended and retracted positions. In one example of an embodiment, the architectural-structure covering 100 may include a first rotatable member 125 (FIGS. 3 and 4). In use, the first rotatable member 125 is operatively associated with the first covering 120. In the illustrated embodiment including a headrail, the headrail 110 is arranged and configured to house the first rotatable member 125. The first rotatable member 125 may be rotatably coupled between the end caps 112, 114. In use, rotation of the first rotatable member 125 in a first direction may retract the first covering 120 while rotation of the first rotatable member 125 in a second, opposite direction may extend the first covering 120.

As further illustrated in FIG. 1, the architectural-structure covering 100 also includes a second covering 220 movable between an extended position and a retracted position (illustratively, the position shown in FIG. 1). As illustrated, the second covering 220 is positioned behind the first covering 220 (e.g., the first covering 120 is positioned closer to the room facing side of the architectural-structure covering 100 as compared to the second covering 220).

In use, the second covering 220 may be operatively associated with an operating system and/or an operating element to actuate movement of the second covering 220 between the extended and retracted positions. In one example of an embodiment, the architectural-structure covering 100 may include a second rotatable member 225 (FIGS. 3 and 4). In use, the second rotatable member 225 is operatively associated with the second covering 220. In the illustrated embodiment including a headrail, the headrail 110 is arranged and configured to house the second rotatable member 225. In use, similar to the operation of the first rotatable member 125, rotation of the second rotatable member 225 in a first direction may retract the second covering 220 while rotation of the second rotatable member 225 in a second, opposite direction may extend the second covering 220.

Thus arranged, the first and second coverings 120, 220 are separately and independently movable (e.g., capable of being independently raised or lower) so that the positions of the first and second coverings 120, 220, respectively, may be separately and independently adjustable.

Figure 2:
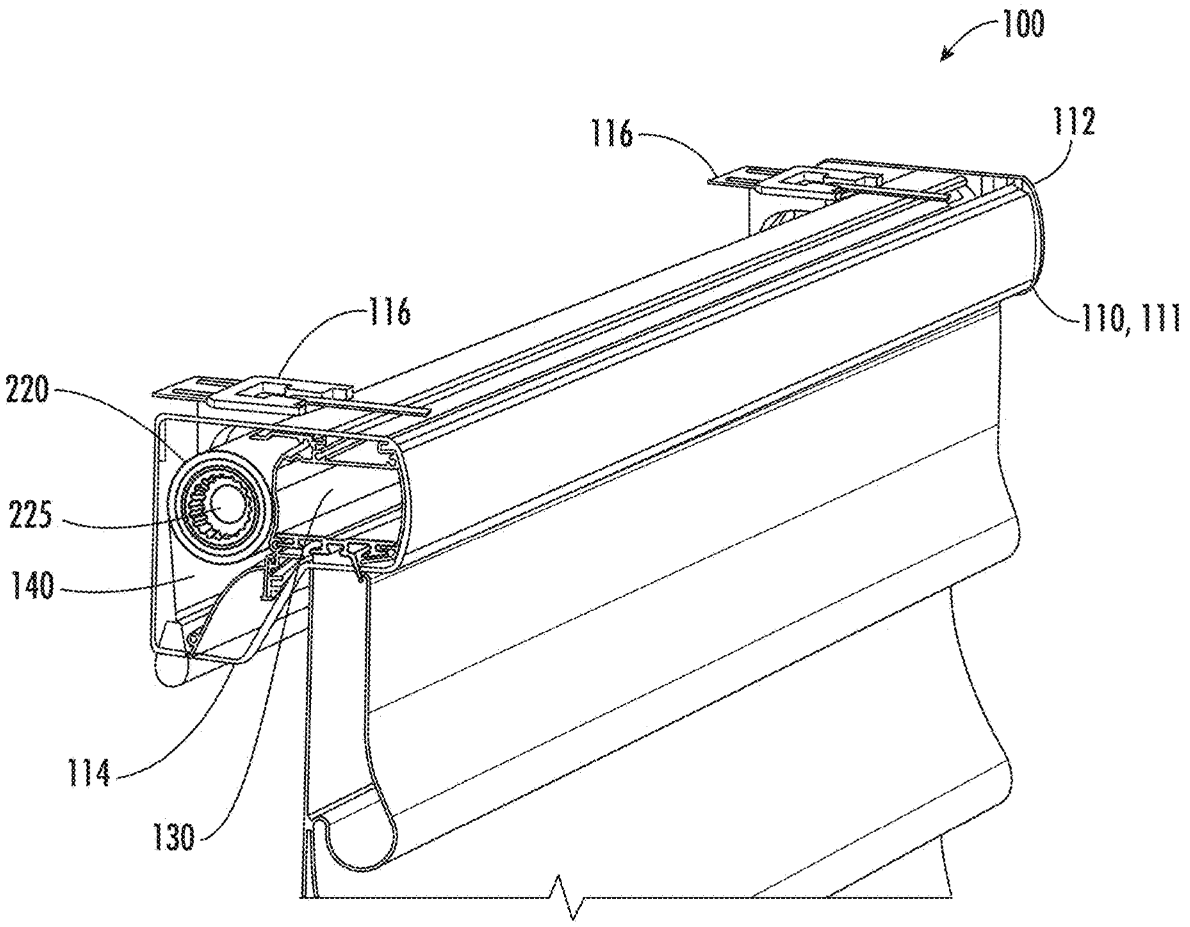
FIG. 2 is a front, perspective view illustrating an example of an embodiment of a headrail that may be used in connection with the architectural-structure covering of FIG. 1.

Referring to FIG. 2, in accordance with one aspect of the present disclosure, an example of an embodiment of the headrail 110 including a housing 111 having opposed end caps 112, 114 to form an open-bottom enclosure is shown. The illustrated embodiment of the headrail 110 is one example of an embodiment of a headrail that may be used in combination with the architectural-structure covering 100 illustrated in FIG. 1. As generally shown, the headrail 110 may include first and second sections, partitions, portions, mounting areas, etc. 130, 140 (used interchangeably herein) for positioning the first and second rotatable members 125, 225, respectively. For purposes of the present disclosure, detailed discussion will now turn to general aspects, features, etc. associated with the second covering 220. As such, for the sake of brevity, operation of the first covering 120 is omitted herefrom. For additional information relating to the headrail and specifically an example of an embodiment of the first portion 130 of the headrail reference is hereby made to U.S. patent application Ser. No. 16/747,831, filed on Jan. 21, 2020, entitled "Headrail for an Architectural-Structure Covering", the contents of which are hereby incorporated by reference in its entirety. However, as previously mentioned, any suitable headrail may be used and the present disclosure should not be limited to the specific construction or details of the headrail unless specifically claimed. For example, referring to FIG. 4, an alternate example of a headrail 110' that may be used in combination with the architectural-structure covering 100 illustrated in FIG. 1 is shown. For additional information relating to the headrail 110' reference is hereby made to U.S. patent application Ser. No. 14/743,578, filed on Jun. 18, 2015, entitled "Blind Assembly with Two Blind Head Rail", the contents of which are hereby incorporated by reference in its entirety.

Referring to FIGS. 3 and 4, in the illustrated embodiment, the second portion 140 of the headrail 110,110' contains the second rotatable member 225. In addition, the second portion 140 of the headrail 110,110' contains sufficient space to contain the second covering 220 when the second covering 220 is wound about the second rotatable member 225 when in the retracted position. Meanwhile, the second portion 140 may also be arranged and configured to minimize height and depth of the headrail 110,110'.

In use, the first and second rotatable members 125, 225 are separately and independently movable (e.g., capable of being separately and independently raised or lower) so that the positions of the first and second coverings 120, 220, respectively, may be separately and independently adjustable. Thus arranged, the second covering 220 can be moved between the extended and retracted positions separately and independently of the first covering 120.

In accordance with one aspect of the present disclosure, referring to FIGS. 3 and 4, the architectural-structural covering 100 includes a light source 300 for directing light onto the second covering 220 when the second covering 220, or at least a portion thereof, is extended. In use, in one example of an embodiment, the architectural-structure covering 100 provides light from the light source 300 onto the second covering 220, which is arranged and configured to reflect the received light from the light source 300 toward the interior space of the room in which the architectural-structure covering 100 is located. Thus arranged, to the extent that the second covering 220 is partially extended (e.g., to the extent that the second covering 220 is moved to an intermediate position between the retracted position and the fully extended position), the architectural-structure covering 100 will reflect (e.g., illuminate) light across the partially extended second covering 220. For example, as shown, in one example of an embodiment utilizing a headrail, a light source 300 for directing light onto the second covering 220 when the second covering 220, or at least a portion thereof, is extended from the headrail 110, 110' may be positioned within the second portion 140 of the headrail 110, 110'.

Figure 5:
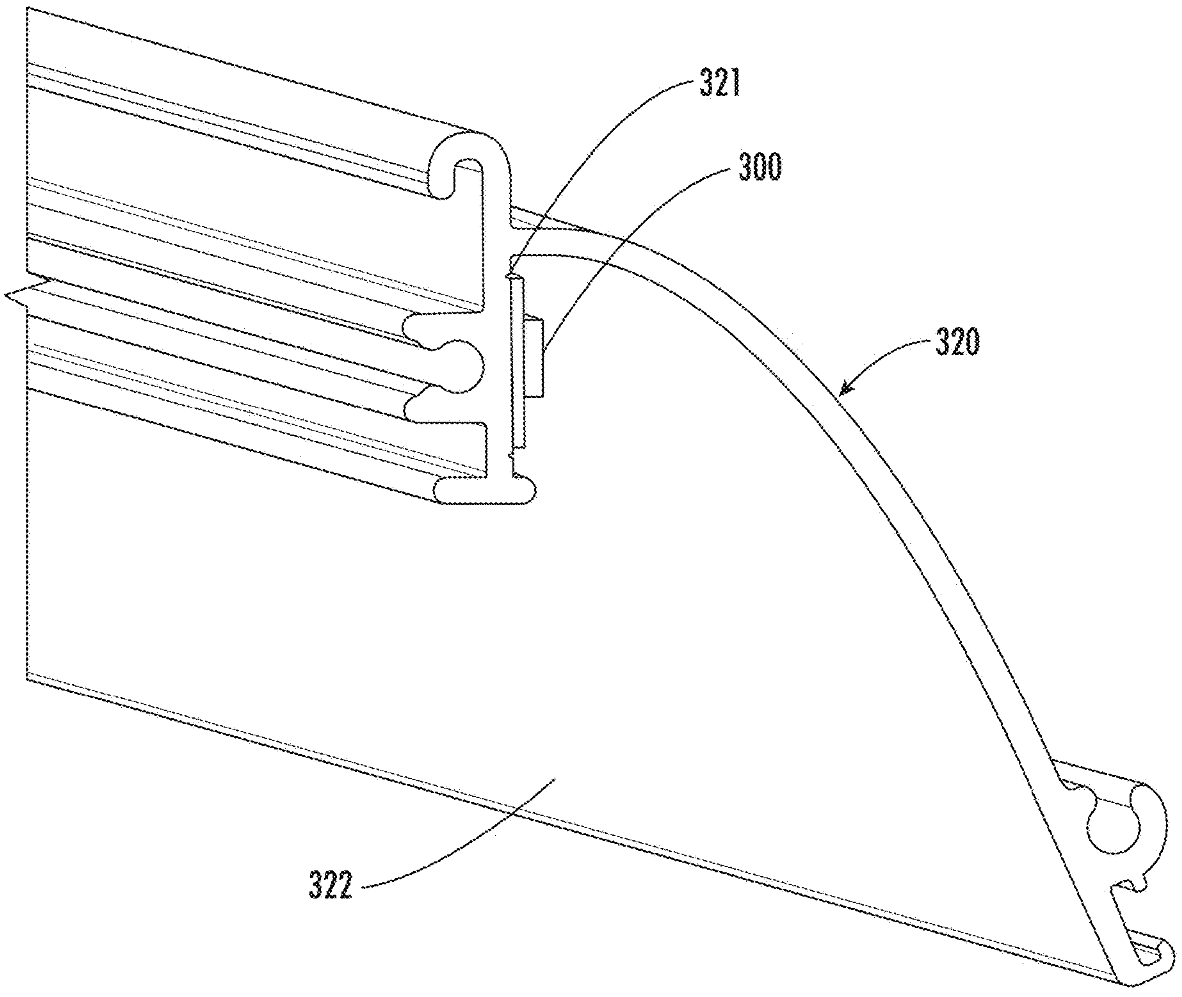
FIG. 5 is a partial perspective view of an example of an embodiment of a reflector that may be positioned within a headrail in accordance with one or more aspects of the present disclosure.
Figure 6:
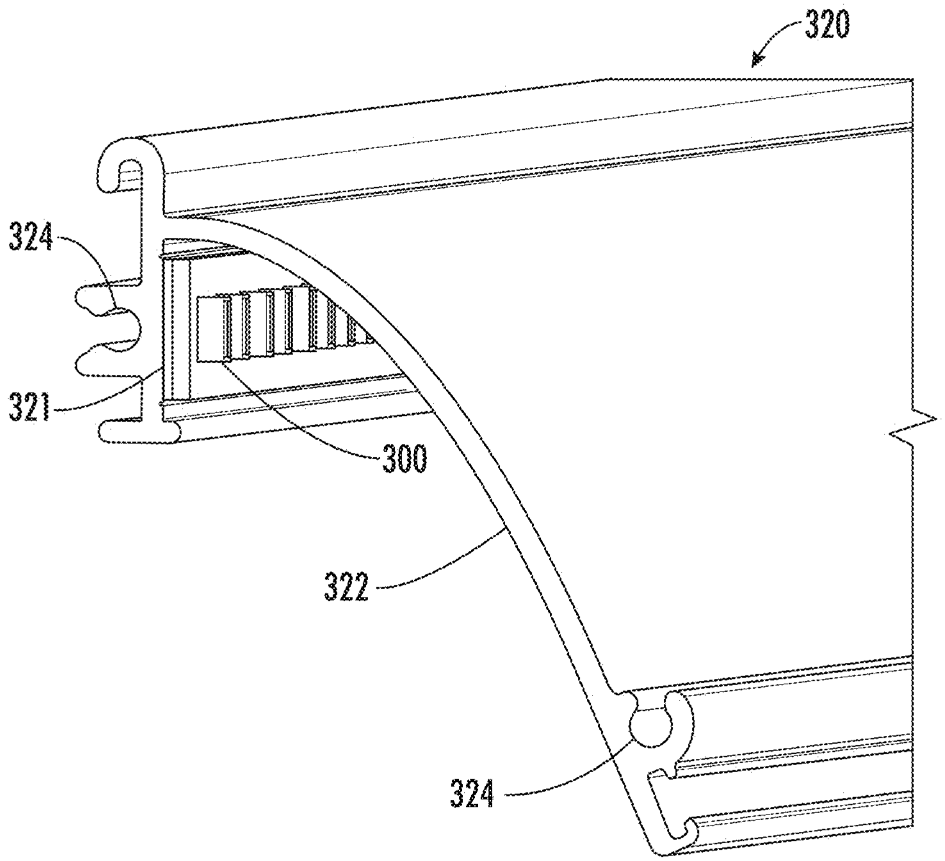
FIG. 6 is an alternate partial perspective view of the reflector shown in FIG. 5.

In one example of an embodiment, as generally represented in FIGS. 5 and 6, the light source 300 may be in the form of a plurality of light-emitting diodes arranged and configured in a strip that extends across the length of the headrail 110, 110', although it is envisioned that the light source may take on any other suitable form. For example, the light source (e.g., LEDs) may be arranged and configured in an array. As such, it should be appreciated that the light source (e.g., LEDs) may be provided in any suitable form and/or configuration arranged and configured to provide the desired intensity and uniformity of light output. In addition, and/or alternatively, the light source may be arranged and configured to provide variable hue, tone, color temperature, color rendering index (CRI), etc. (e.g., light source may be arranged and configured to provide, for example, warm/cool light).

In use, the light source 300 is arranged and configured to direct emitted light onto the second covering 220 when the second covering 220 is extended, or at least partially extended. Thereafter, the second covering 220 is arranged and configured to distribute the light from the light source 300 toward the interior space of the room in which the architectural-structure covering is located. In one example of an embodiment, the second covering 220 is manufactured from a reflective material that is arranged and configured to reflect the emitted light from the light source 300 toward the interior space of the room in which the architectural-structure covering is located (e.g., the second, reflective covering 220 is arranged and configured to reflect the emitted light from the light source 300). In addition, in one embodiment, the second covering 220 may be manufactured from a flexible material so that the second covering 220 can be extended and retracted such as, for example, wound and unwound, stackable, etc.

Thus arranged, in use, the first covering 120 may be moved between the extended and retracted positions as desired. For example, the first covering 120 is arranged and configured to operate as any known architectural-structure covering. For example, the first covering 120 may be extended to provide privacy, to conceal the underlying architectural structure, to modify the flow-through of natural light, etc. In addition, the first covering 120 may be retracted to reveal the underlying architectural structure, to adjust view-through, etc.

Thereafter, the second covering 220 may be extended and the light source 300 activated to illuminate the architectural-structure covering 100 (e.g., light source 300 may be illuminated to direct light onto the second covering 220, which is arranged and configured to reflect the light toward the interior space of the room in which the architectural-structure covering 100 is positioned thus giving the appearance that the architectural-structure covering 100, or at least the extended or exposed portion of the second covering 220, is being illuminated. In this manner, the architectural-structure covering 100 may be arranged and configured to provide light. For example, during evening hours, with the first covering 120 at least partially extended, the second covering 220 may be partially extended and the light source 300 turned ON to provide lighting (e.g., the covering portions of the architectural-structure covering 100 may be illuminated in place of room lighting).

In one example of an embodiment, the first and second coverings 120, 220 may be arranged and configured to extend and retract substantially in unison. That is, for example, although the first and second rotatable members 125, 225 are separate and independently operable, in one example of an embodiment, the first and second rotatable members 125, 225 may be arranged and configured to rotate in a manner such that the first and second coverings 120, 220 extend and retract in unison (e.g., to extend and retract simultaneously at the same time and/or to the same extent). Thus arranged, as the first and second coverings 120, 220 are movable between their retracted positions and their extended positions to any point in between, the user can select how much of the architectural structure 100 is covered by the first and second coverings 120, 220 (e.g., the user can view through, for example, a portion of the window that is not covered by the partially extended coverings).

The light source 300 may be mounted, coupled, etc. by any suitable mechanism now known or hereafter developed. For example, in connection with a headrail 110, 110', the light source 300 may be mounted to an underside of the headrail 110, 110', and in one embodiment, the light source 300 may be adhered, fastened, etc. to the headrail 110, 110', although any suitable mechanism for coupling the light source 300 to the headrail 110, 110' may be utilized. Alternatively, in connection with embodiments where there is no headrail, the light source 300 may be mounted, for example, directly to the architectural-structure by any suitable mechanism.

In accordance with another aspect of the present disclosure, referring to FIGS. 3-6, the architectural-structure covering 100 may also include a reflector 320. The light source 300 may be coupled to the reflector 320 to emit light onto a surface of the reflector 320. For embodiments in which the light source 300 is coupled to the reflector 320, the reflector 320 may be arranged and configured as a heat sink to draw heat away from the light source (e.g., LEDs) 300 during operation. The light source (e.g., LEDs) 300 may be mounted to the reflector 320 (e.g., heat sink) via heat transfer tape, heat transfer adhesive, or the like. In use, the reflector 320 assists with drawing heat away from the light source 300. In one example of an embodiment, as shown, the reflector 320 may be positioned within the headrail 110, 110' for embodiments including a headrail. Although not illustrated, as will be appreciated by one of ordinary skill in the art, the light source (e.g., LEDs) 300 may be associated with a lens, a collimator, or the like. In one embodiment, each LED 300 may be associated with an individual lens, collimator, or the like. In another embodiment, a single lens, collimator, or the like may be used for the plurality of LEDs 300. In use, the lens, collimator, or the like may be utilized to redirect the light and/or to improve uniform light distribution.

In use, the reflector 320 may be arranged and configured to reflect, direct, etc. the emitted light from the light source 300 towards the second, reflective covering 220. For example, in one example of an embodiment, as shown in FIGS. 5 and 6, the reflector 320 may include a base portion 321 and a reflective surface 322. The base portion 321 may be arranged and configured to receive, mount, etc. the light source 300. The reflective surface 322 may be arranged and configured to extend from the base portion 321 so that, in use, the reflective surface 322 is positioned adjacent to and/or below the light source 300. Thus arranged, in use, the emitted light from the light source 300 is directed onto the reflective surface 322 and towards the second, reflective covering 220. In one example of an embodiment, the reflective surface 322 may be arcuate, curved, etc. such as, for example, parabolic, cylindrical, partially spherical, etc. although the reflective surface may have any shape arranged and configured to reflect the emitted light from the light source 300 towards the second, reflective covering 220. In one embodiment, referring to FIGS. 3, 5, and 6, the reflective surface 322 preferably includes a parabolic shape. It has been discovered that by utilizing a parabolic shape improved uniformity of emitted light was obtained across the covering when the covering was in the extended position. In this manner, the emitted light from the light source 300 may be more evenly distributed, thus avoiding the appearance of spotting (e.g., appearance of dark spots).

In one embodiment where a headrail is used, the reflector 320 may be coupled to the headrail 110, 110' by any suitable mechanism now known or hereafter developed. For example, in one embodiment, the reflector 320 may extend an entire length of the headrail 110, 110', although it is contemplated that the reflector 320 could also be installed in an intermittent manner along the length of the headrail (e.g., using multiple individual reflectors), or could cover only a portion of the length of the headrail. For embodiments where a headrail is used, the reflector 320 may be coupled to the opposing end caps 112, 114. For example, the reflector 320 may include openings 324 formed in the reflector 320 for receiving inwardly extending projections, fasteners, etc. 115 (FIG. 3) sized and arranged to be received by the openings 324 formed in the reflector 320.

The reflector 320 may be sized and shaped to reflect light from the light source 300 onto any portion of the second covering 220 and/or any portion of the headrail 110, 110'. As will be appreciated, it may be desirable to provide an even illumination of the architectural structure covering 100 along its entire extended length. Thus, by adjusting the manner in which light is reflected via the reflector 320, it can be possible to facilitate even illumination. That is, in one example of an embodiment, by reflecting light from the light source 300 via the reflector 320 onto the second covering 220 even illumination (e.g., continuous lighting from top to bottom without shadows, interruption, etc.) may be achieved.

In one example of an embodiment, the reflector 320 may be fixably positioned during assembly to optimize reflection from the light source 300 onto any portion of the second covering 220 and/or any portion of the headrail 110, 110'. Alternatively, however, it is envisioned that the reflector 320 may be arranged and configured to be adjustable (e.g., movably positioned) relative to the second covering 220 and/or any portion of the headrail 110, 110' to facilitate field adjustments.

In use, in one example of an embodiment, the architectural-structure covering 100 provides light from the light source 300 onto the second, reflective covering 220 and from the second, reflective covering 220 toward the interior space of the room in which the architectural-structure covering 100 is located. Thus arranged, to the extent that the second covering 220 is partially extended (e.g., to the extent that the second covering 220 is moved to an intermediate position between the retracted position and the fully extended position), the architectural-structure covering 100 will reflect (e.g., illuminate) light across the partially extended second covering 220 allowing the user to view through the remaining uncovered portions of the underlying architectural structure not covered by the second covering 220 (e.g., user can view through the window not covered by the second covering 220).

That is, in one example of an embodiment, the upper or first portion of the architectural-structure covering 100, to the extent that the first and second coverings 120, 220 are extended, may provide light while the lower or second portion of the architectural-structure covering 100, to the extent that the first and second coverings 120, 220 are not fully extended, may provide view through. This provides the user with numerous options in being able to determine the amount of light to be emitted. In addition, by arranging the light source 300 to direct light onto a second, reflective covering 220 from, for example, above such as, for example, by positioning the light source 300 with a headrail, advantages over, for example, side lighting an architectural-structure covering are provided (e.g., side lighting results in the entire length of the underlying architectural structure being lit regardless of the positioning of the covering).

Thus, in connection with one example of an embodiment of the present disclosure, as the first and second coverings 120, 220 are extended, the user can enable portions of the architectural-structural covering 100 to be illuminated. For example, in applications where the underlying architectural structure is a window or an opening, as the first and second coverings 120, 220 are extended, the user can enable view-through the underlying architectural structure while enabling portions of the architectural-structure covering 100 to be illuminated (e.g., the architectural-structure covering 100 is arranged and configured to only reflect (e.g., illuminate) light to the extent that the second, reflective covering 220 is extended). The light emitted from the light source 300 can be arranged and configured to be directed onto the second covering 220, thus without extending the second covering 220, the light emitted from the light source 300 will not be reflected towards the interior space of a room in which the architectural-structure covering is located.

In addition, the light source 300 and the second, reflective covering 220 may be arranged and configured to provide even distribution of light across the exposed (e.g., extended) surface area of the second covering 220. That is, in one example of an embodiment, the architectural-structure covering 100 is arranged and configured to reflect light evenly across the entire cross-sectional area of the second covering 220. Thus, with the second covering 220 extended to its fully extended position, the reflected light may be distributed across the entire extended length of the second covering 220. However, by enabling the second covering 220 to be independently and separately movable relative to the first covering 120, the user can control the amount, extent, etc. of the reflected light. For example, by only partially extending the second covering 220, the user can control the extent to which light will be reflected (e.g., the user can control the extent of reflected light by controlling the length to which the second covering 220 is extended, light will only be reflected or distributed across the cross-sectional area of the second covering 220 (e.g., light will only be reflected or distributed across a cross-sectional area of an extended portion of said second, reflective covering, light will not be reflected beyond the extended cross-sectional area of the second, reflective covering 220)).

In accordance with another aspect of the present disclosure, the architectural-structure covering 100 including deployment of the first and second coverings 120, 220 and control of the light source 300 may be remotely controlled such as, for example, via a wireless remote device, although it is envisioned that the remote device could be coupled to the architectural-structure covering 100 via a hardwired connection. For example, as will be readily appreciated by one of ordinary skill in the art, the architectural-structure covering 100 may be operatively associated with an APP running on a remote device such as, for example, a smartphone, a tablet, a computer, etc. Alternatively, the architectural-structure covering 100 may be operatively associated with a dedicated remote-control device, a wall switch, etc. In use, the remote device can be programed to, for example, control position of the first and second coverings 120, 220 (e.g., to extend and retract the first and second covering 120, 220), to turn ON and OFF the light source 300, etc. In addition, the architectural-structure covering 100 can be programed to take specific actions throughout the day. For example, the architectural-structure covering 100 can be programmed to automatically turn ON the light source 300 at a certain time, for example, in the morning to wake the user, or to turn OFF at a certain time, to extend or retract the coverings 120, 220, etc. In addition, the light source 300 may be arranged and configured to emit different color temperatures so that, for example, the light source 300 may be arranged and configured to mimic the color of the natural light throughout the day, alternatively the user could program the light source 300 to provide a desired color temperature, etc. Moreover, by controlling the color temperature of the emitted light, the user can also control, alter, etc. the appearance of the covering (e.g., first covering 120). For example, by controlling the color temperature of the light, the user could make the fabric appear different colors.

In one embodiment, the second covering 220 may include a bottom rail, an additional light source may be positioned along the bottom rail. In use, the additional light source may be directed upwards so that, in the fully deployed position, the additional light source may facilitate providing uniform light distribution across the entire covering. In one embodiment, power may be provided to the additional light source via power lines coupled to, integrated with, etc. the operating cords.

The second covering 220 may be manufactured from any suitable, reflective material now known or hereafter developed. For example, the second, reflective covering 220 may be manufactured from a material arranged and configured to reflect light. In one example of an embodiment, the second, reflective covering 220 may be manufactured from a nonwoven, fabric material arranged and configured to reflect light. In one embodiment, the fabric material may be arranged and configured with a metal coating and/or a protective clear film or coating. In use, the film or coating is arranged and configured to reflect light. In one embodiment, the film or coating may have an optical density of 0.90 or greater to prevent light from passing through the film or coating from the outside. Alternatively, in another embodiment, the fabric may include reflective yarns arranged and configured to reflect light toward the covering. In addition, the reflective yarns may also include a light blocking construction to prevent light from entering from the outside. In one embodiment, the second, reflective covering 220 may be manufactured from a projection material such as, for example, StarBright CLR® (Ceiling Light Rejecting) material manufactured and sold by Elite Screens.

Similarly, the reflector 320 may be manufactured from any suitable material now known or hereafter developed. Alternatively, the reflector 320 can be made from any material and a reflective surface 322 can be applied to the reflector 320, the reflective surface 322 may be manufactured from a material arranged and configured to reflect light. For example, the reflective surface 322 may be formed by a layer such as a tape, a reflective coating, a paint coating, etc. In one example of an embodiment, the reflector 320 be manufactured from a metallic material such as, for example, aluminum. The metallic reflector 320 may include a mil finish. Optionally, the metallic reflector 320 may include a reflective coating as needed. In an alternate embodiment, the reflector 320 may be manufactured from a translucent film. Thus arranged, the architectural-structure covering could provide the impression that the building is occupied at night when the covering is lit up, while allowing the window to appear to be glowing to inside occupants. During the daytime, the translucent film could be an alternate shade or used in combination with the front shade for further light reduction without full blackout.

Referring to FIG. 1, in one example of an embodiment, the first covering 120 of the architectural-structure covering 100 may be manufactured from a flexible material arranged and configured to be wound or unwound about the first rotatable member 125. Alternatively, the first covering 120 may be manufactured from a flexible material arranged and configured to gather or stack adjacent to the first rotatable member 125. For example, the first covering 120 may include a plurality of folds that are raised or lowered as lift cords are wrapped about or unwrapped from the first rotatable member 125. The lift cords may be coupled to the first rotatable member 125 and may be operatively coupled to the first covering 120, for example, a bottom rail 122 of the first covering 120. Thereafter, rotation of the first rotatable member 125 in a first direction wraps the lift cords about the first rotatable member 125 causing the first covering 120 to retract adjacent to the first rotatable member 125, while rotation in a second direction causes the lift cords to unwrap about the first rotatable member 125 causing the first covering 120 to move in an extended configuration. However, it will be appreciated that although illustrated and described in a particular form, the first covering 120 may be any type of covering now known or hereafter developed. For example, when in the retracted position, the first covering 120 may be arranged and configured to be wound about the first rotatable member 125. Alternatively, the first covering 120 may be in the form of a cellular shade such as, for example, a honey-comb, etc.

Referring to FIG. 1, in one example of an embodiment, as illustrated, the second covering 220 of the architectural-structure covering 100 may be wrapped around the second rotatable member 225 in the retracted position. For example, the second covering 220 may be manufactured from a flexible material arranged and configured to be wrapped about the second rotatable member 225 to retract the second covering 220 or unwrapped from the second rotatable member 225 to extend the second covering 220. However, it will be appreciated that although illustrated and described in a particular form, the second covering 220 may be manufactured from other type of coverings. For example, in one embodiment, the second covering 220 may be arranged and configured to be stackable.

As previously mentioned, the first and second coverings 120, 220 may be operatively associated with operating systems and/or operating elements to actuate movement of the first and second coverings 120, 220. The operating systems and/or operating elements may be any suitable operating systems and/or operating elements now known or hereafter developed to actuate movement of the first and second coverings 120, 220. For example, the operating system and/or element can take any appropriate form (e.g., a clutch, a gear, a motor, a drive train, and/or a gear train, etc.) and can include any type of controls (e.g., continuous loop, raise/lower cord(s), chains, ropes, a motor, etc.). As such, the present disclosure should not be limited by the details of the first covering as described and illustrated herein unless specifically claimed.

Figure 7A:
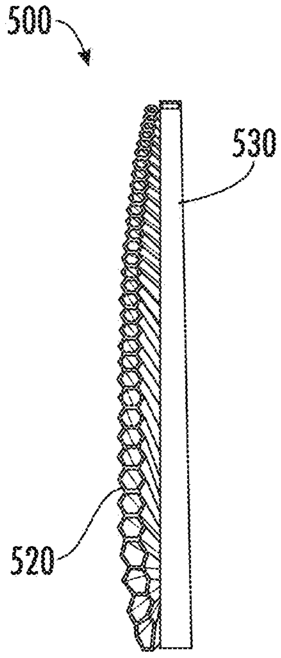
FIG. 7A is a side view of an alternate example of an embodiment of an architectural-structure covering in accordance with one or more aspects of the present disclosure.
Figure 7B:
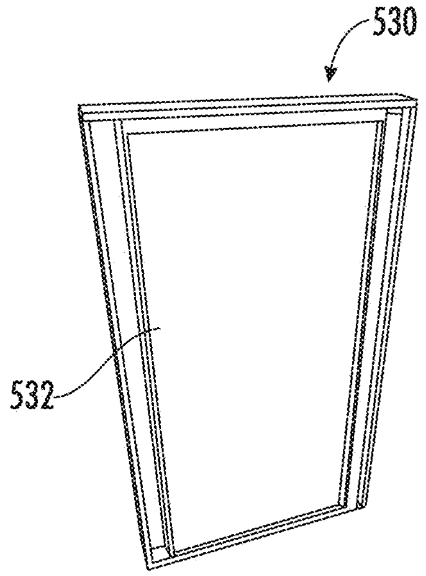
FIG. 7B is a front perspective view of an example of an embodiment of a light box that may be used in connection with the architectural-structure covering of FIG. 7A.
Figure 7C:
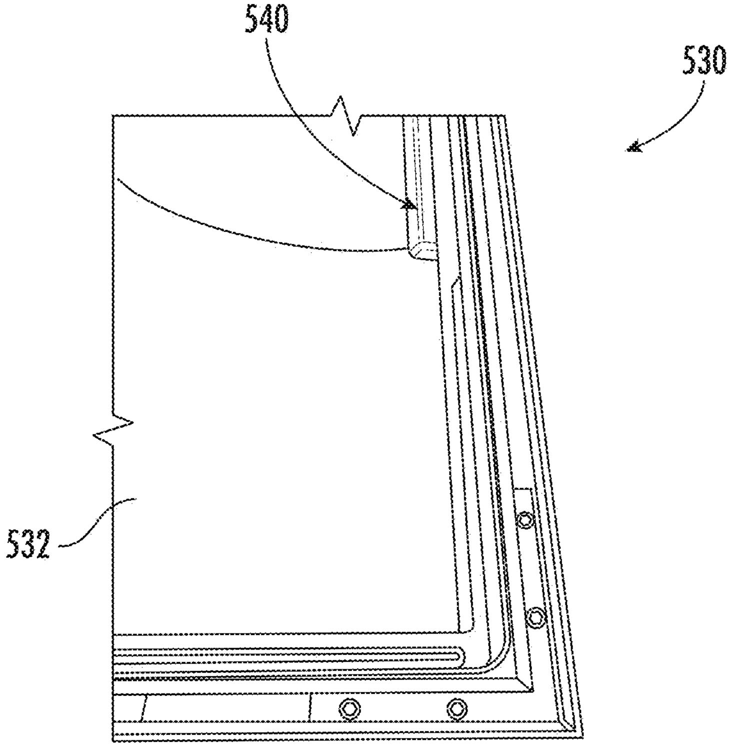
FIG. 7C is a detailed view of an example of an embodiment of a light strip that may be used in connection with the light box of FIG. 7B.
Figure 8A:
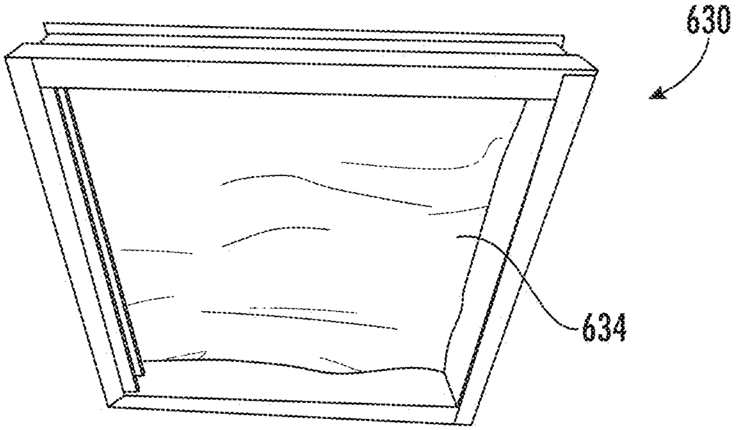
FIGS. 8A-8C are various front perspective views of an alternate example of an embodiment of a light box that may be used in connection with an architectural-structure covering.
Figure 8B:
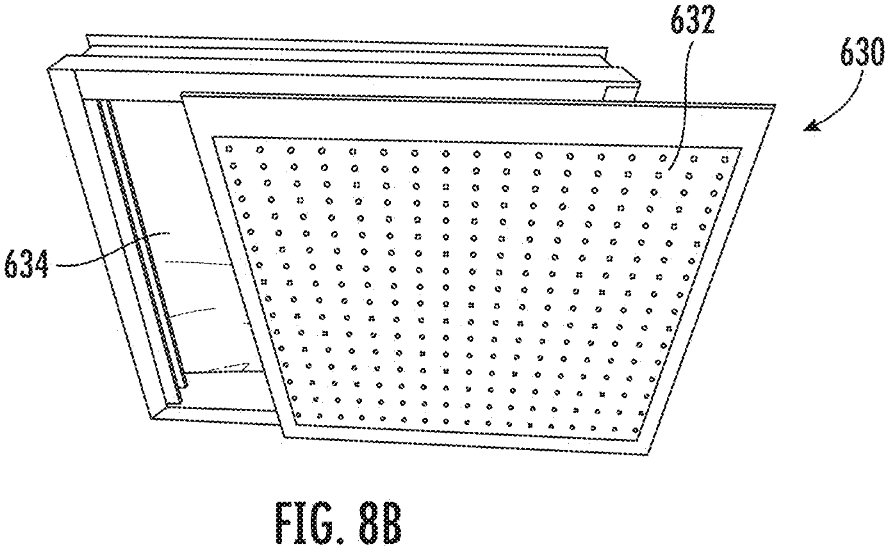
Figure 8C:
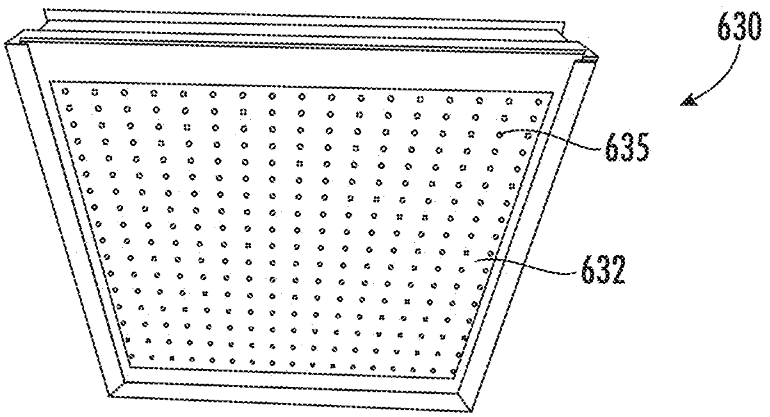
Figure 8D:
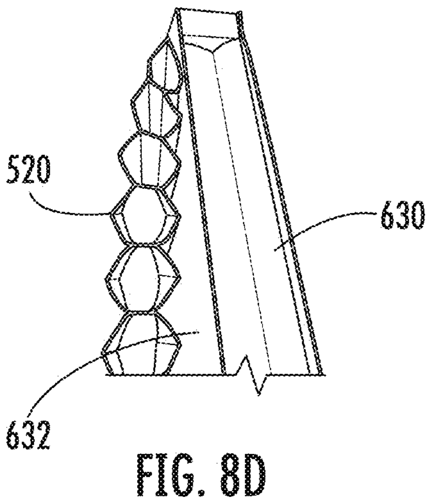
FIG. 8D is a side view of an alternate example of an embodiment of an architectural-structure covering incorporating the light box of FIGS. 8A-8C.

Referring to FIGS. 7A-7C, an alternate example of an embodiment of an architectural-structure covering 500 is illustrated. In use, the architectural-structure covering 500 may include a covering 520. As illustrated in FIG. 7A, the covering 520 may be in the form of a honeycomb shade. Alternatively, the covering 520 may be any now known or hereafter developed covering including, for example, a fabric covering, etc. Generally speaking, the covering 520 may be movable, for example, between an extended position and a retracted position, however for reasons that will become apparent, the covering 520 may be arranged and configured to remain relatively stationary.

In accordance with the embodiment of FIGS. 7A-7C, the architectural-structure covering 500 includes a light box 530 positioned behind or rearward of the covering 520. In use, the light box 530 can be positioned within an opening formed in a wall. Alternatively, the light box 530 can be positioned against a wall (e.g., hung on a wall in a building). Thereafter, the covering 520 can be positioned in front of the light box 530 (e.g., the covering 520 can be positioned on an interior side of the light box 530).

In one embodiment, the light box 530 may be in the form of a lighted (e.g., LED) flat panel. As such, the light box 530 may include a front cover or surface 532, a rear wall or surface, and top, bottom, and first and second lateral surfaces or walls. In this manner, the light box 530 may take the form of a rectangle or square, although other shapes are envisioned. In addition, the light box 530 can have any size such as, for example, 2 ft×4 ft, 4 ft×4 ft, etc. For example, in one embodiment, the LED flat panel may be constructed from an aluminum frame or extrusion to create a frame. In use, referring to FIG. 7C, lights (e.g., LEDs) 540 may be positioned on the longitudinal edges of the light box 530. For example, the lights (e.g., LEDs) may take the form of low-voltage DC LEDs grouped together is series, typically in strings of 6 to 12 LEDs. In use, the lights (e.g., LEDs) 540 positioned along the longitudinal edges of the light box 530 may be arranged and configured so that the LEDs 540 progressively turn ON as the covering is lowered so that the user doesn't see any visible LEDs (e.g., the longitudinal LEDs are arranged and configured to partially turn ON so that only the portion of the LEDs commensurate with the length of the extended covering are turned ON). In addition, and/or alternatively, the LEDs 540 may be covered by a cover such as, for example, a milky white cover to conceal the LEDs 540.

In use, the front cover or surface 532 can be translucent so that light emitted from within the light box 530 can be transmitted through the front cover or surface 532. The rear wall or surface can be light-blocking, translucent or reflective depending on the application. Thus arranged, the light box 530 is arranged and configured to backlight the covering 520.

In accordance with this embodiment, the architectural-structure covering 500 including the covering 520 and the light box 530 can be positioned anywhere to create an atmosphere mimicking day light. In particular, the architectural-structure covering 500 may be particularly useful in interior rooms, basements, or other areas devoid of any windows and natural day light. By incorporating the architectural-structure covering 500 including the covering 520 and the light box 530, the impression of a window mimicking natural day light can be achieved.

Referring to FIGS. 8A-8D, an alternate example of an embodiment of a light box 630 is illustrated. As illustrated, the light box 630 may include a reflective rear surface 634 disposed within the light box 630. In addition, and/or alternatively, the light box 630 may include a front sheet 632 that may include a plurality of perforations 635 arranged and configured to enable each individual LED to be exposed thru the perforated front sheet 632. Thus arranged, by incorporating the reflective rear surface 634 and/or the perforated front sheet 632, more uniform light distribution may be obtained. In one embodiment, as previously mentioned, each LED may include, for example, a lens arranged and configured to widen the spread or distribution of emitted light to improve the uniformity of light distribution and reduce the overall thickness of the light box 630.

As illustrated, the LEDs (not shown) and corresponding perforation 635 can be provided in a uniform array so that the light from the individual LEDs may pass through the individual perforations, although it is envisioned that the LEDs and corresponding perforations 635 can be provided in alternate configurations, numbers, etc.

Figure 9A:
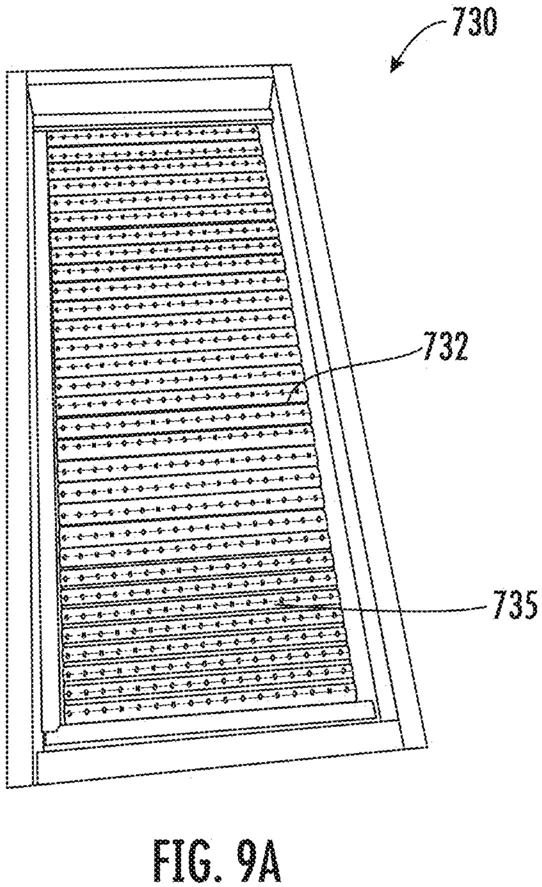
FIG. 9A is a front perspective view of an alternate example of an embodiment of a light box that may be used in connection with an architectural-structure covering.
Figure 9B:
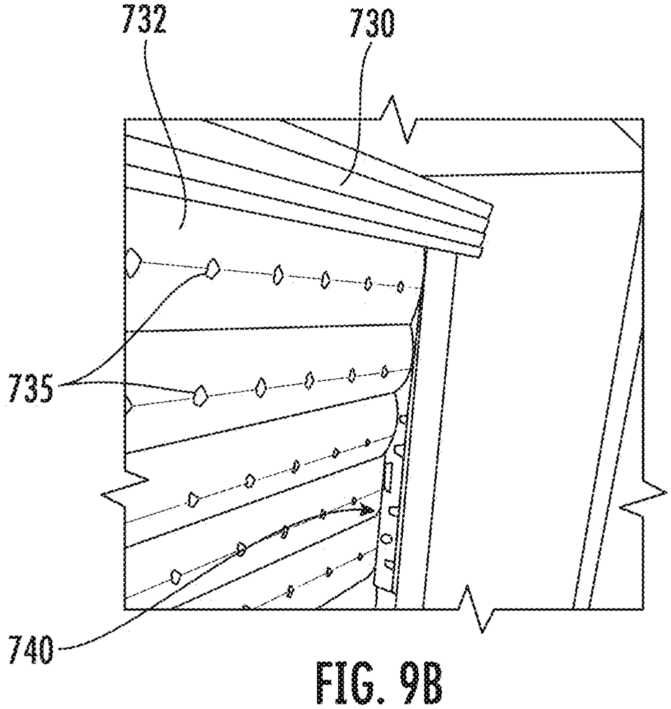
FIG. 9B is a detailed perspective view of the light box of FIG. 9B.

Referring to FIGS. 9A and 9B, an alternate example of an embodiment of a light box 730 is illustrated. As illustrated, the light box 730 may include a front covering, cover or sheet 732 manufactured from a honeycomb covering. In use, the honeycomb covering may include a plurality of perforations 735 arranged and configured to enable each individual LED to be exposed thru the perforated honeycomb covering. In addition, interior surfaces of the cells of the honeycomb covering may include a reflective surface. Furthermore, as illustrated the light box 730 may include side lighting. That is, as illustrated, lighting strips (e.g., LEDs) 740 may be incorporated along, for example, the lateral side edges of the light box 730. In this embodiment, light emitted from the lighting strips 740 may pass into the perforated honeycomb covering 732 and may pass through the individual perforations.

Figure 10A:
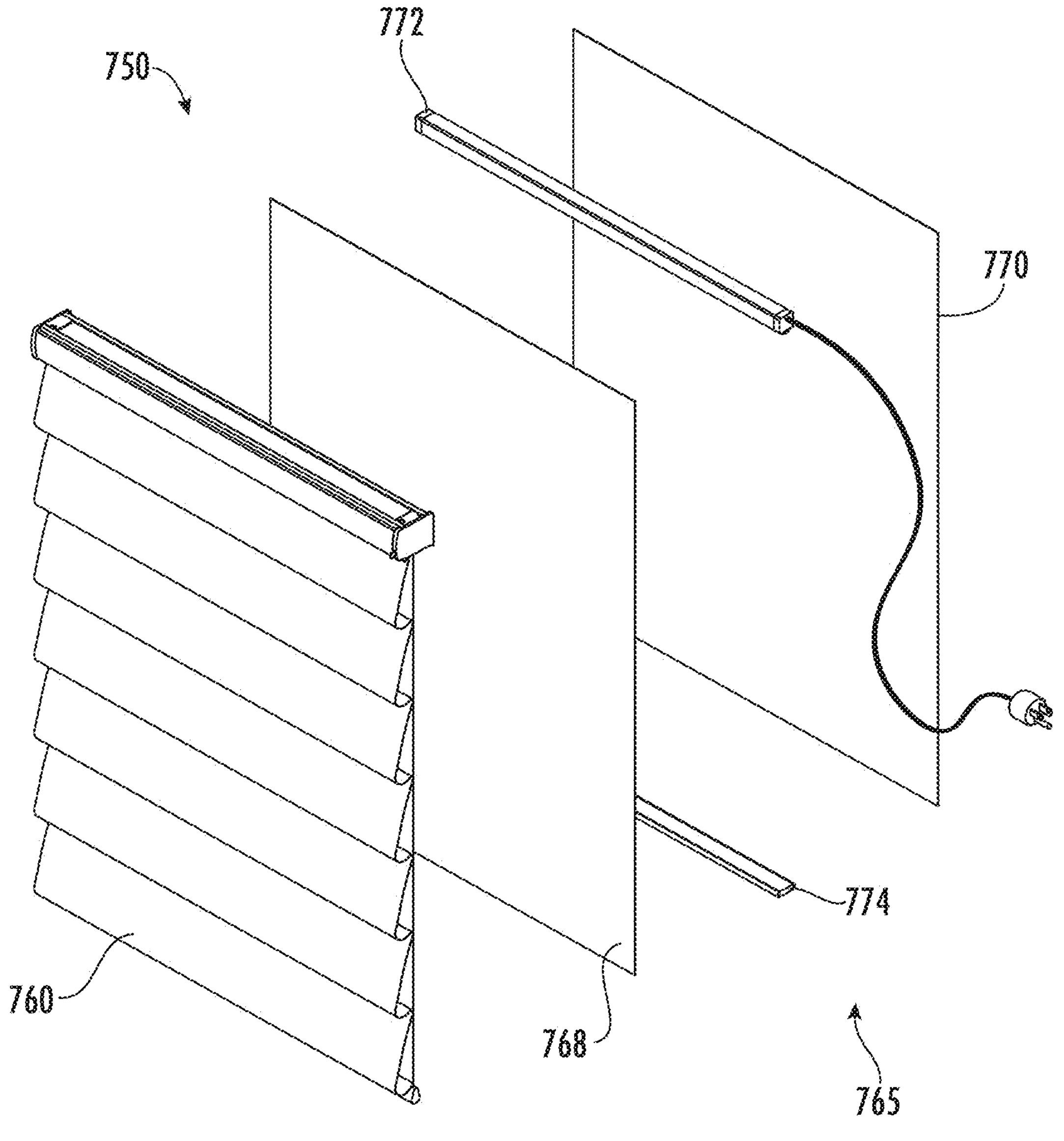
FIG. 10A is an exploded, perspective view of an alternate example of an embodiment of an architectural-structure covering utilizing a light box in accordance with one or more aspects of the present disclosure.
Figure 10B:
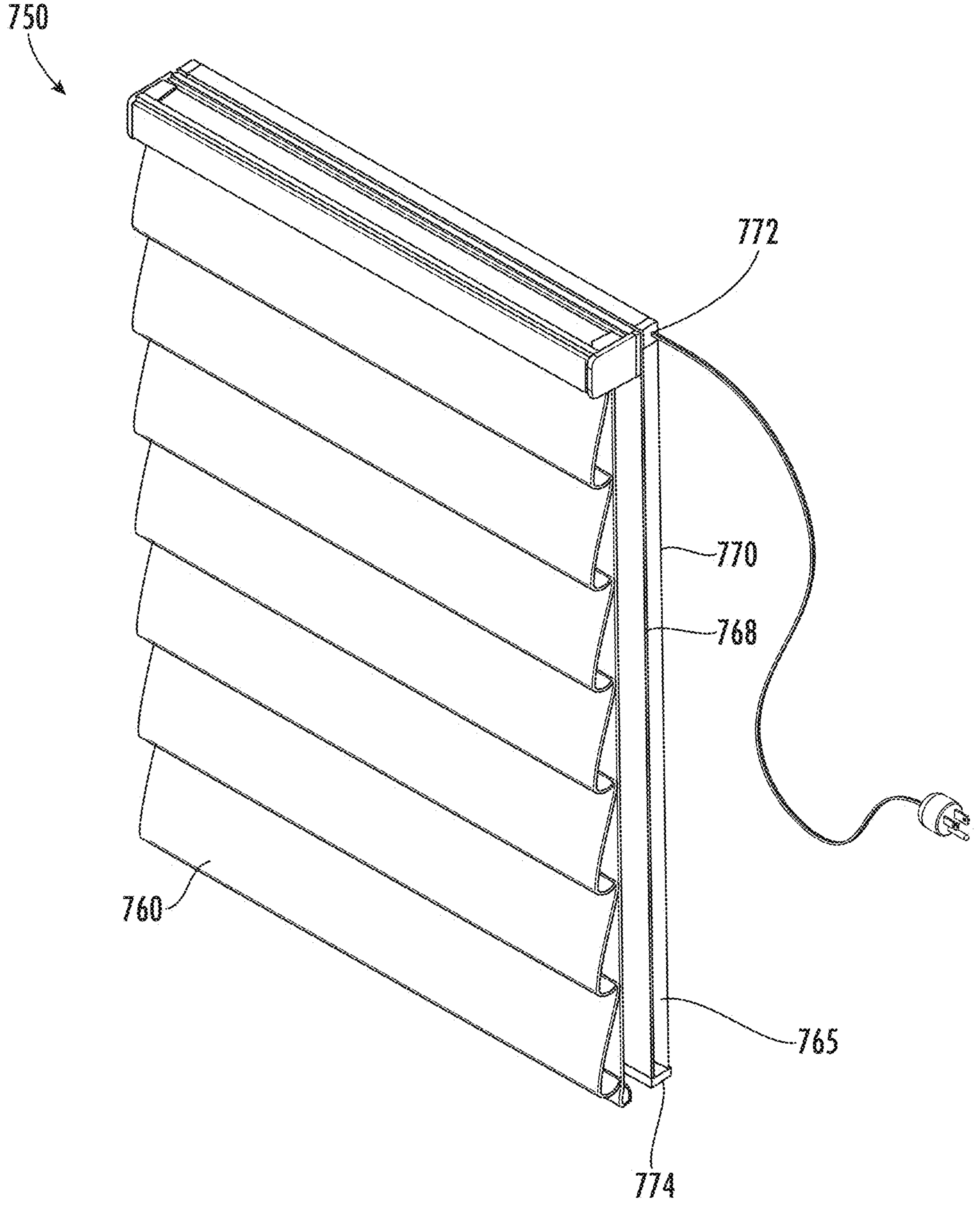
FIG. 10B is a front perspective view of the architectural-structure covering of FIG. 10A.

Referring to FIGS. 10A and 10B, an alternate example of an embodiment of an architectural-structure covering 750 is illustrated. In use, the architectural-structure covering 750 may include a covering 760. The covering 760 may be any now known or hereafter developed covering including, for example, a decorative fabric covering, etc. Generally speaking, the covering 760 may be movable, for example, between an extended position and a retracted position, however for reasons that will become apparent, the covering 760 may be arranged and configured to remain relatively stationary.

In accordance with the embodiment of FIGS. 10A and 10B, the architectural-structure covering 750 includes a light box 765 positioned behind or rearward of the covering 760. In use, the light box 765 can be positioned within an opening formed in a wall. Alternatively, the light box 765 can be positioned against a wall (e.g., hung on a wall in a building). Thereafter, the covering 760 can be positioned in front of the light box 765 (e.g., the covering 760 can be positioned on an interior, room-facing side of the light box 765).

In one embodiment, as illustrated, the light box 765 includes a front cover or surface 768, a rear wall or surface 770, and a light bar 772 positioned between the front cover 768 and rear wall 770. The light box 765 may also include a bottom rail 774 and, optionally first and second lateral surfaces or walls. In this manner, the light box 765 may take the form of a rectangle or square, although other shapes are envisioned. In use, as illustrated, the light bar 772 may be positioned between the front cover 768 and the rear wall 770 along a top edge thereof, although other configurations are envisioned such as, for example, along a bottom edge thereof, along the lateral side edges, etc.

In use, the front cover or surface 768 may be manufactured from a transparent or translucent material such as, for example, a shear fabric. The rear wall or surface 770 may be manufactured from a reflective material as described herein. The light bar 772 may be arranged and configured as a plug-in capable of being plugged into a standard electrical outlet, although other configurations are envisioned. Thus arranged, light emitted from the light bar 772 can be transmitted through the front cover or surface 768. The rear wall or surface 770 can be reflective, alternatively it is envisioned that the rear wall or surface could be light-blocking or translucent depending on the application. Thus arranged, the light box 765 is arranged and configured to backlight the covering 760.

Alternatively, in one embodiment, the light box 765 may be in the form of an edge-lit light guide such as, for example, ACRYLITE® LED light guiding edge lit acrylic. In use, light is fed into an edge of highly transparent material and evenly emitted across the surface thereof. In use, instead of the light box 765, an edge-lit light guide could be placed over the entire window. Thus arranged, the daytime view could be maintained, and then at night, with the covering fully extended, the acrylic light guide sheet could be turned ON.

In accordance with this embodiment, the architectural-structure covering 750 including the covering 760 and the light box 765 can be positioned anywhere to create an atmosphere mimicking day light. In particular, the architectural-structure covering 750 may be particularly useful in interior rooms, basements, or other areas devoid of any windows and natural day light. By incorporating the architectural-structure covering 750 including the covering 760 and the light box 765, the impression of a window mimicking natural day light can be achieved.

Figure 11A:
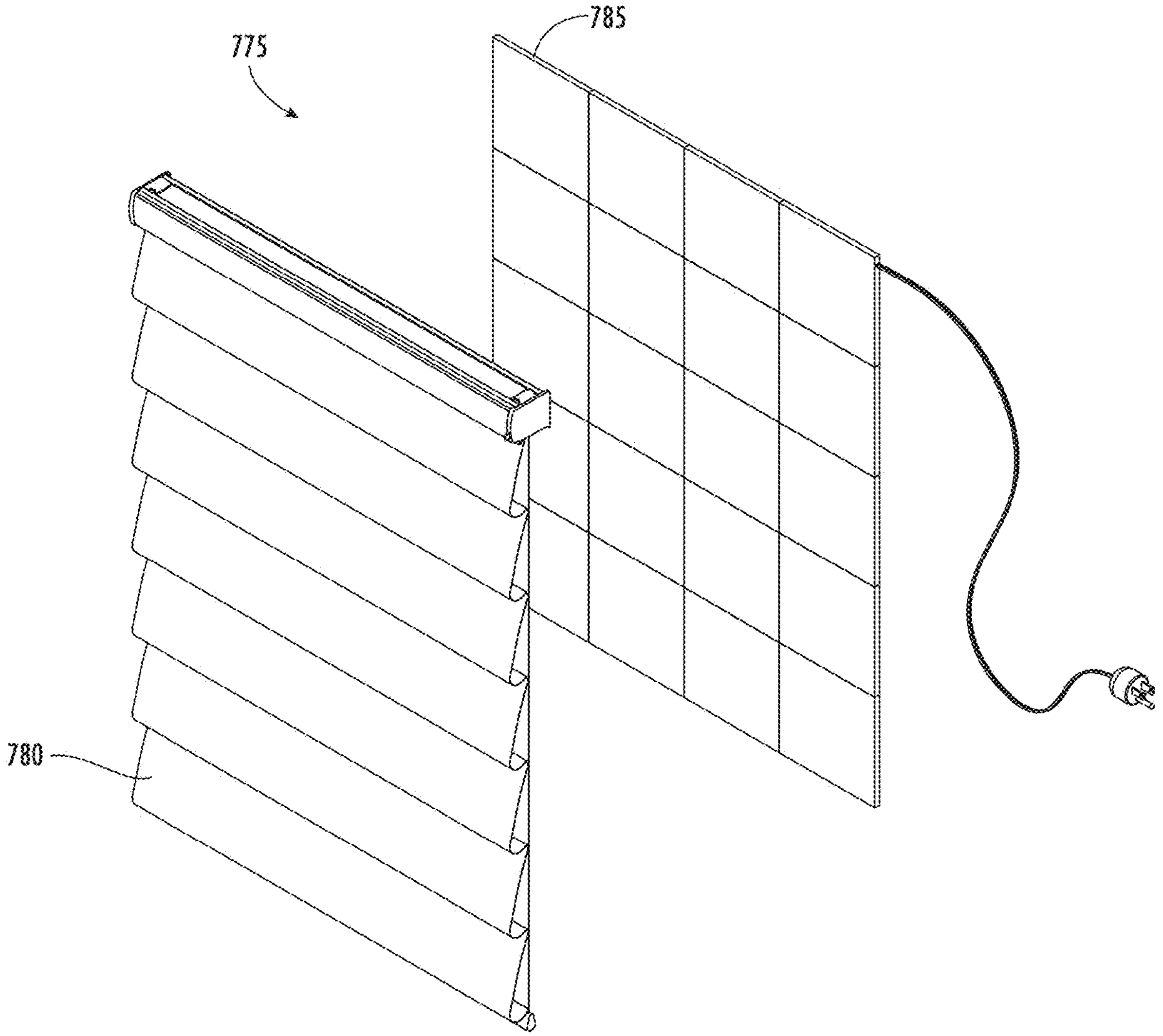
FIG. 11A is an exploded, perspective view of an alternate example of an embodiment of an architectural-structure covering utilizing a light box in accordance with one or more aspects of the present disclosure.
Figure 11B:
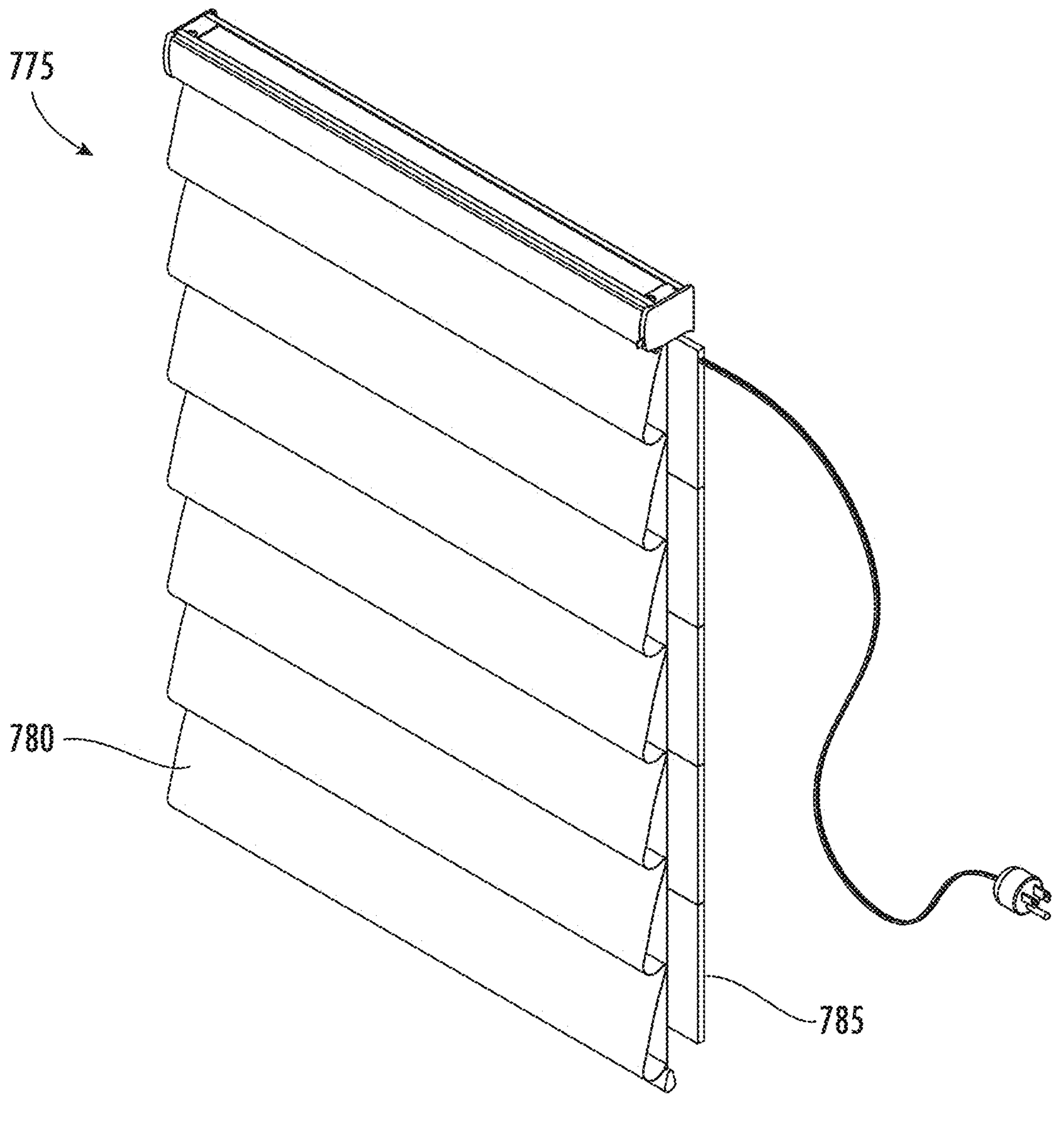
FIG. 11B is a front perspective view of the architectural-structure covering of FIG. 11A.

Referring to FIGS. 11A and 11B, an alternate example of an embodiment of an architectural-structure covering 775 is illustrated. In use, the architectural-structure covering 775 may include a covering 780. Similar to the embodiment described above in connection with FIGS. 10A and 10B, the covering 780 may be any now known or hereafter developed covering including, for example, a decorative fabric covering, etc. Generally speaking, the covering 780 may be movable, for example, between an extended position and a retracted position, however for reasons that will become apparent, the covering 780 may be arranged and configured to remain relatively stationary.

In accordance with the embodiment of FIGS. 11A and 11B, the architectural-structure covering 775 includes a light box 785 positioned behind or rearward of the covering 780. Similar to the embodiment described above in connection with FIGS. 10A and 10B, in use, the light box 785 can be positioned within an opening formed in a wall. Alternatively, the light box 785 can be positioned against a wall (e.g., hung on a wall in a building). Thereafter, the covering 780 can be positioned in front of the light box 785 (e.g., the covering 780 can be positioned on an interior, room-facing side of the light box 785).

In one embodiment, as illustrated, the light box 785 may be in the form of a light panel such as, for example, an LED flat panel manufactured by Nanoleaf, an OLED panel manufactured by Lumiblade, or the like. In one embodiment, as illustrated, the light panel may be arranged and configured as a plug-in capable of being plugged into a standard electrical outlet, although other configurations are envisioned. Thus arranged, the light box (e.g., light panel) 785 is arranged and configured to backlight the covering 780. Alternatively, in one embodiment, it is envisioned that the light box 785 could be replaced with an image or pattern. In use, the covering 780 could be raised and lowered to reveal the underlying image. For example, a flat panel TV, a Nanoleaf panel, an OLED panel, or the like could be provided. In use, the covering 780 could be raised and lowered to reveal the underlying image provided on, for example, the flat panel TV.

In accordance with this embodiment, the architectural-structure covering 775 including the covering 780 and the light box (e.g., light panel) 785 can be positioned anywhere to create an atmosphere mimicking day light. In particular, the architectural-structure covering 775 may be particularly useful in interior rooms, basements, or other areas devoid of any windows and natural day light. By incorporating the architectural-structure covering 775 including the covering 780 and the light box (e.g., light panel) 785, the impression of a window mimicking natural day light can be achieved.

Figure 12A:
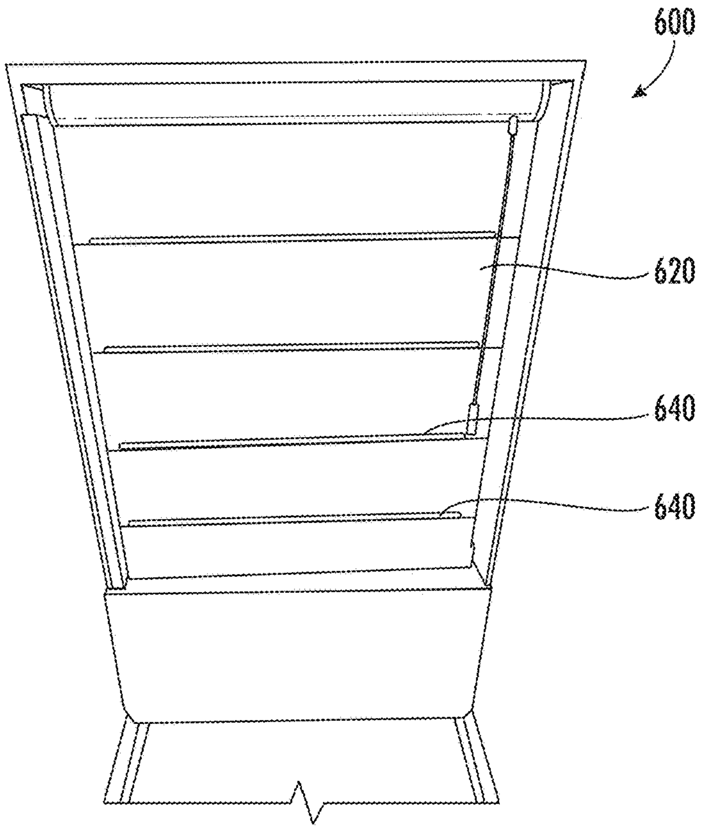
FIG. 12A is a front perspective view of an alternate example of an embodiment of an architectural-structure covering in accordance with one or more aspects of the present disclosure.
Figure 12B:
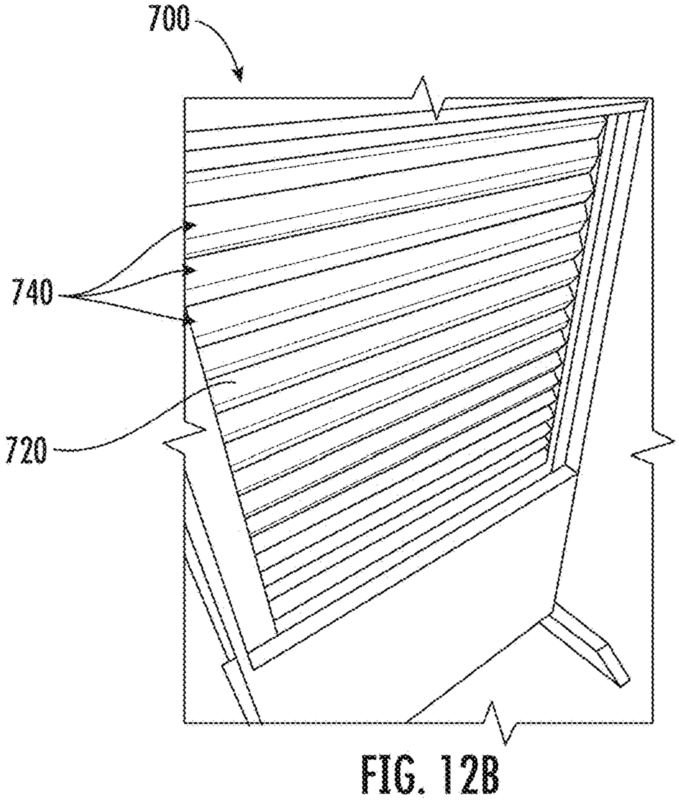
FIG. 12B is a front perspective view of an alternate example of an embodiment of an architectural-structure covering in accordance with one or more aspects of the present disclosure.

Referring to FIGS. 12A and 12B, alternate examples of an embodiment of an architectural-structure covering 600, 700 are illustrated. In use, the architectural-structure coverings 600, 700 may include a covering 620, 720, respectively, movable between an extended position and a retracted position. For example, the covering 620, 720 can be vertically extendable or retractable (e.g., able to be lowered or raised, respectively, in a vertical direction) between the extended position and the retracted position for obscuring and exposing the underlying architectural structure. The covering 620, 720 may be any now known or hereafter developed covering including, for example, a fabric covering (as illustrated in FIG. 12A), a honeycomb (as illustrated in FIG. 12B), etc.

Figure 12C:
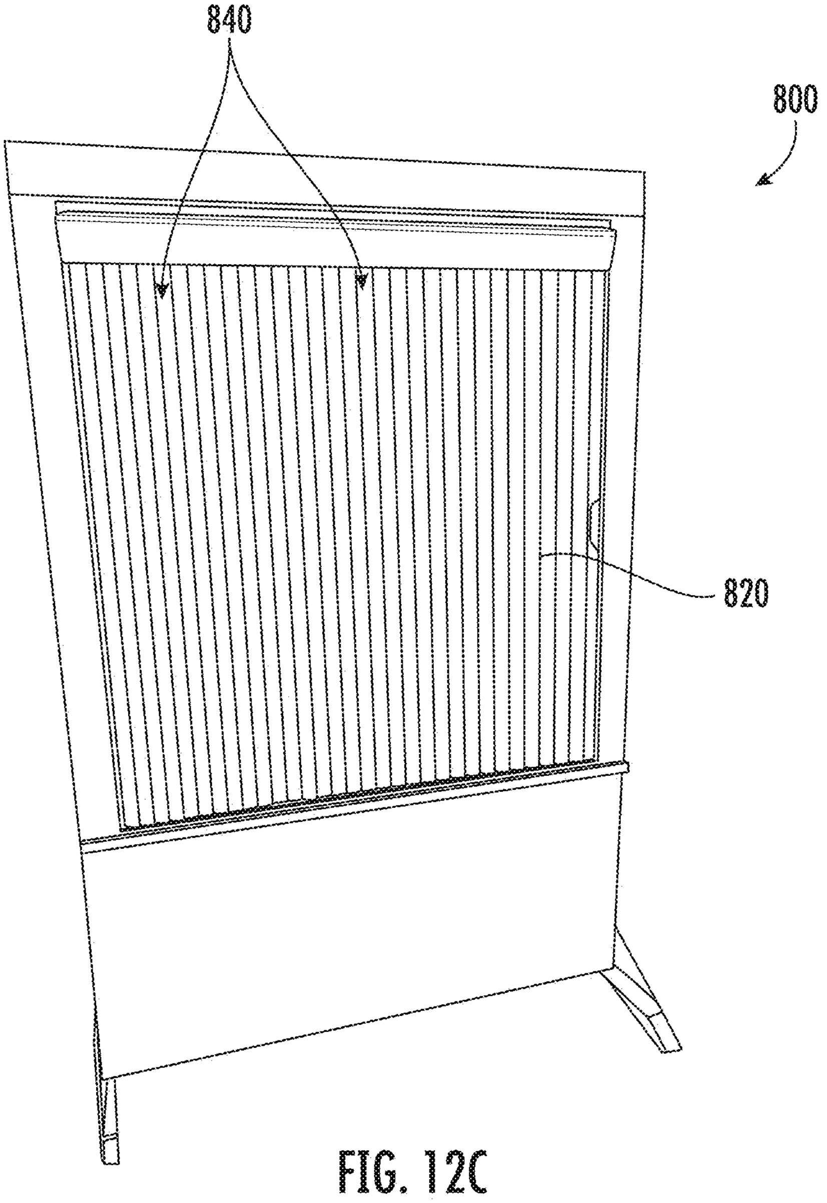
FIG. 12C is a front perspective view of an alternate example of an embodiment of an architectural-structure covering in accordance with one or more aspects of the present disclosure.

In accordance one or more aspects of the present disclosure, the architectural-structure coverings 600, 700 include one or more light strips (e.g., LED strips) 640, 740 disposed within one or more folds, cells, etc. of the covering 620, 720. Thus arranged, the light strips (e.g., LED strips) 640, 740 provide illumination of the covering 620, 720. For example, as illustrated, the covering 620, 720 is arranged and configured to provide lighting, for example, extending across the width of the covering, although it is envisioned that the light strips 840 can be disposed in alternate orientations such as, for example, vertically in a vertical covering 820 in a vertically suspended architectural-structure covering 800 as illustrated in FIG. 12C.

In one embodiment, the light strips (e.g., LED strips) 640, 740, 840 may be in the form of a metal core print circuit board (PCB) with LEDs. Thus arranged, as illustrated in FIGS. 12A-12C, the light strips (e.g., LED strips) 640, 740, 840 may be disposed within the individual folds or cells of a fabric-based covering such as, for example, a Roman shade. Alternatively, as illustrated, the light strips (e.g., LED strips) 640, 740, 840 may be disposed within the individual folds or cells of a honeycomb shade. In use, as illustrated, the light strips (e.g., LED strips) 640, 740, 840 may be disposed in each fold or cell of the covering 620, 720, 820. Alternatively, the light strips (e.g., LED strips) 640, 740, 840 may be disposed in every other fold or cell of the covering 620, 720, 820, every third fold or cell, etc.

In use, the light strips (e.g., LED strips) 640, 740, 840 may be coupled within the folds or cells of the covering 620, 720, 820 by any suitable mechanism now known or hereafter developed including, for example, an adhesive, tape, etc.

Figure 13A:
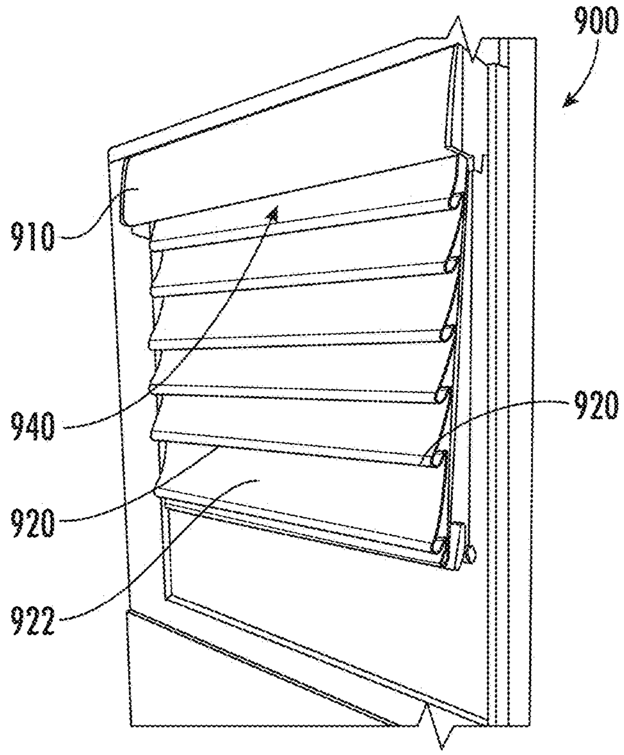
FIG. 13A is a front perspective view of an alternate example of an embodiment of an architectural-structure covering in accordance with one or more aspects of the present disclosure.
Figure 13B:
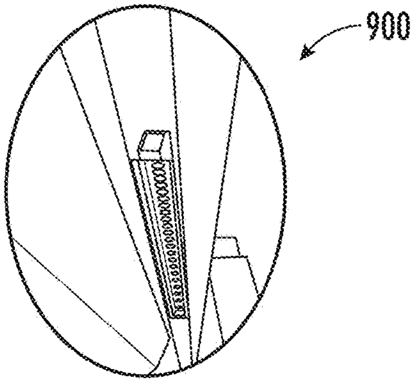
FIG. 13B is a detailed perspective view of the headrail of the architectural-structure covering of FIG. 13A.
Figure 13C:
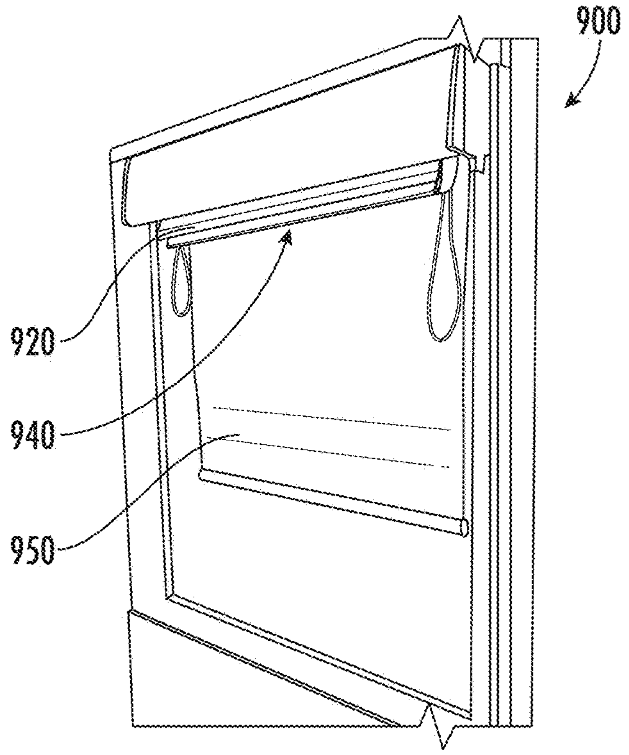
FIG. 13C is a front perspective view of an alternate example of an embodiment of an architectural-structure covering in accordance with one or more aspects of the present disclosure.
Figure 14A:
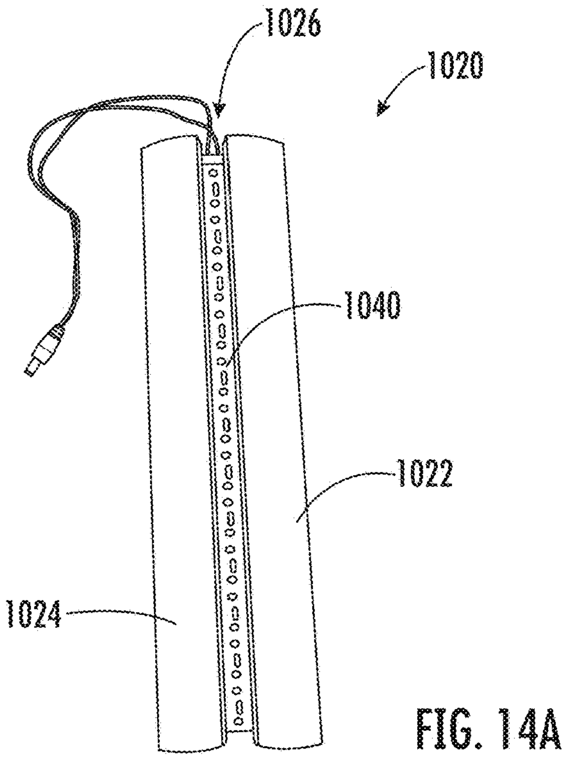
FIG. 14A is a bottom view of an alternate example of an embodiment of a covering in accordance with one or more aspects of the present disclosure.
Figure 14B:
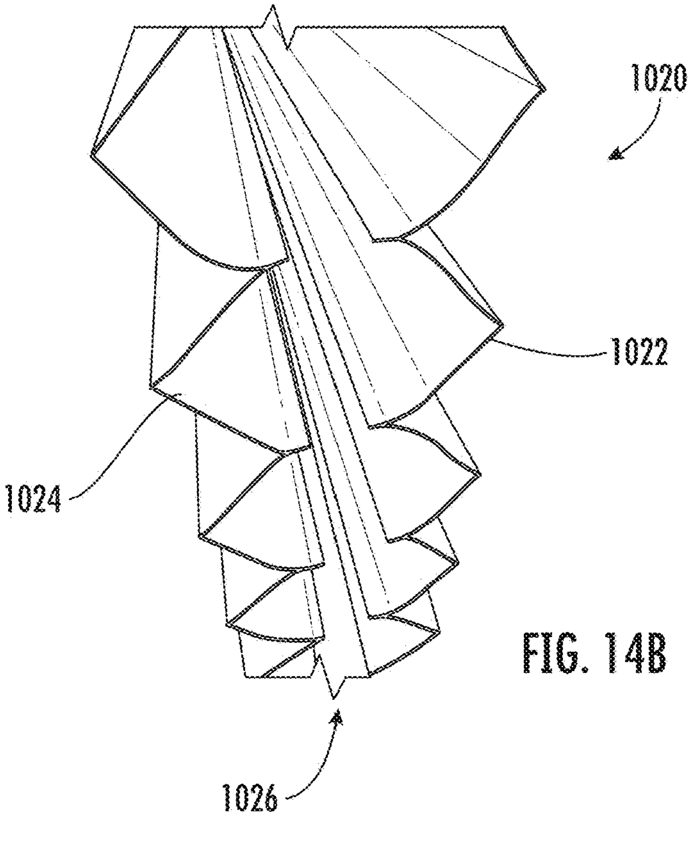
FIGS. 14B-14D are various side views of the covering of FIG. 14A.
Figure 14C:
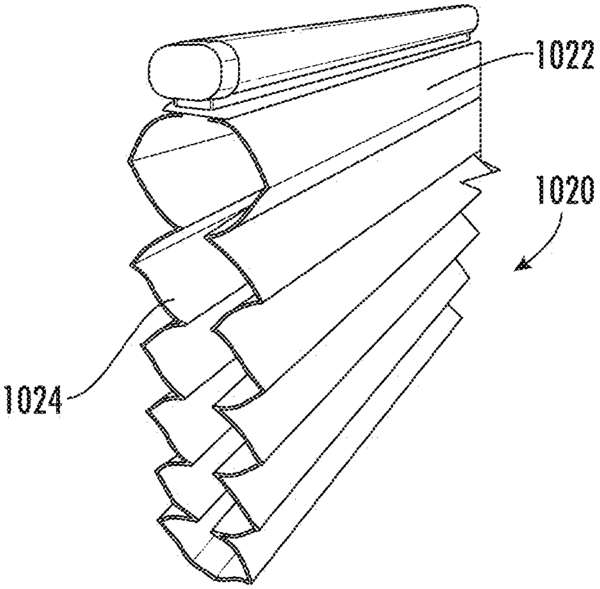
Figure 14D:
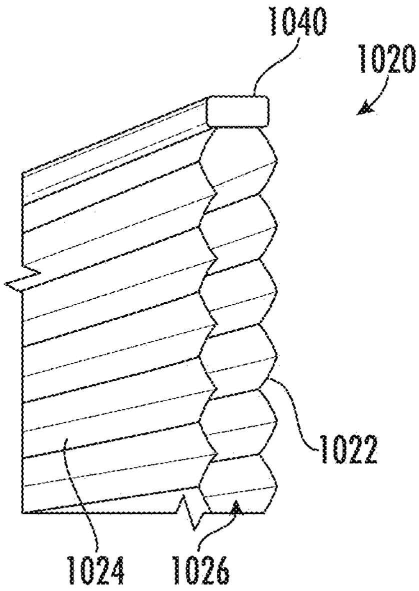

As previously mentioned, and as will be readily appreciated by one of ordinary skill in the art, an architectural-structure covering may also include a headrail, which may be in the form of a housing having opposed end caps joined by front, back, and top sides to form an open bottom enclosure. Referring to FIGS. 13A-13C, in accordance with another example of an embodiment of an architectural-structure covering 900, one or more light strips (e.g., LEDs) 940 may be disposed within a headrail 910. In use, the one or more light strips (e.g., LEDs) 940 may extend across a substantial width of the headrail 910 such as, for example, approximately ⅔ a width of the headrail 910, although it is envisioned that the light strip (e.g., LEDs) 940 may extend more or less. In addition, and/or alternatively, the one or more light strips (e.g., LEDs) 940 may be positioned in front of the covering 920, which may take the form of any suitable covering 920 now known or hereafter developed covering including, for example, a fabric covering, a honeycomb, etc. Thus arranged, the light strips (e.g., LEDs) 940 are arranged and configured to illuminate a front surface 922 of the covering 920.

In addition, as illustrated in FIG. 13C, in one embodiment, the architectural-structure covering 900 may also include a reflective rear covering 950. For example, similar to the reflective rear covering previously described, the reflective rear covering 950 enables improved light reflection and thus may be provided with a surface, coating, etc. that provides a desired degree of reflection of light cast upon it. As illustrated in FIG. 13C, the light strip (e.g., LEDs) 940 may be positioned in the headrail 910 between the front covering 920 and the reflective rear covering 950 such that light emitted from the light strip is reflected off the reflective rear covering toward the front covering 920.

In use, the light strips (e.g., LED strips) 940 may be coupled within the headrail by any suitable mechanism now known or hereafter developed including, for example, fasteners, clips, an adhesive, tape, etc.

In addition, and/or alternatively, referring to FIGS. 14A-14D, the covering 1020 may be cut, divided, separated, etc. into front and rear portions 1022, 1024. For example, as illustrated, in one embodiment, a honeycomb covering may be arranged and configured into front and rear portions 1022, 1024 separated by a gap or space 1026. In use, a light strip (e.g., LEDs) 1040 may be positioned in the headrail of the architectural-structure covering. Thus arranged, light may be emitted from the light strip (e.g., LEDs) 1040 into the gap or space 1026 positioned between the front and rear portions 1022, 1024 of the honeycomb shade. Thus arranged, better, more uniform light distribution may be provided as compared to emitting light from the headrail onto the front surface of the covering.

Moreover, in addition, one or more light strips (e.g., LEDs) 1040 may be positioned within each individual cell of the, for example, honeycomb covering 1020. For example, a light strip (e.g., LEDs) 1040 may be positioned in the uppermost cell of the honeycomb covering 1020, in between the front and rear portions 1022, 1024 of the covering 1020. Alternatively, light strips (e.g., LEDs) 1040 may be positioned within all, or substantially all, of the cells. In use, the light strips (e.g., LDs) 1040 may be positioned between the front and rear portions 1022, 1024 of the covering 1020 in a downward facing orientation (e.g., LEDs are arranged and configured to emit light downwards), although other configurations are envisioned.

In addition, and/or alternatively, a reflective surface may be positioned within each cell to facilitate better, more uniform light distribution. As previously mentioned, the reflective material, surface, covering, etc. (used interchangeably herein without the intent to limit) used and described herein, may be used in any of the preceding embodiments, whether described or not. In addition, reflective surface may be manufactured from a material arranged and configured to reflect light. The reflective surface may be any suitable material now know or hereafter developed including those previously described herein. For example, as previously mentioned, the reflective surface may be manufactured from a non-woven, fabric material arranged and configured to reflect light.

The light strips (e.g. LEDs) may be any suitable lighting product arranged and configured to emit light. For example, the light strip may be in the form of a flexible strip of LEDs such as, for example, an OLED strip or panel such as Flexible OLEDs strips manufactured by Lyteus, Brite 3 or Curve as manufactured by OLED Works, and Luflex Flexible as manufactured by LG Displays. Alternatively, the light strip may be in the form of a flexible LED strip or panel such as, for example, Clyde manufactured by Design LED, a mesh and string LED system such as manufactured by Traxon Technologies or a flexible LED manufactured via 3D printing such as Nth light manufactured by SP Technology. Alternatively, the light strip may be in the form of a LEC/EL flat panel type strip such as, for example, pFy-p2 manufactured by LunaLEC, Glow-Tec manufactured by InvoisCoat GmbH, or EL Panels manufactured by Ellumiglow. Alternatively, the light strip may be in the form of a lighted textile such as, for example, an optical fiber such as, for example, Lightex manufactured by Brochier Technologies or Fibrance manufactured by Versalume. Alternatively, the light strip may be in the form of a glow in the dark material or strip such as, for example, White/White PS Series Ink manufactured by AllureGlow or Invisible GID manufactured by GloMania. Alternatively, the light strip may be in the form of a light-emitting panel such as, for example, a bendable OLEDS manufactured by Konica Minolta or OVJP Printing manufactured by Universal Display Corp.

In use, the architectural-structure covering including the light strip(s) and corresponding circuitry can be powered by any suitable mechanism now known or hereafter developed including, for example, hardwired, plug-in, batter-power, etc. Alternatively, the architectural-structure covering including the light strip(s) and corresponding circuitry can be powered by, for example, Near-Filed charging devices such as, for example, NuIQ™ Technology Platform manufactured by NuCurrent or Equus34 manufactured by Solace, or via a Far-Field charging device such as, for example, Powerspot manufactured by Powercast.

For the sake of convenience and clarity, referring to FIG. 1, all directional references or terms used herein such as, for example, "face," "front," "back," "rear," "top," "bottom," "up," "down," "vertical," "horizontal", "inner," "outer", "proximal," "distal," "upper," "lower," "upward," "downward," "left", "right," "lateral," "longitudinal," "above," "below," "vertical," "horizontal," "radial," "axial," "clockwise," and "counterclockwise" are only used for identification purposes to aid the reader's understanding of the present disclosure, and do not create limitations, particularly as to the position, orientation, or use of this disclosure. These references are used herein to describe the relative placement and orientation of various components and portions of the architectural-structure covering 100, each with respect to the geometry and orientation of the architectural-structure covering 100 as they appear in FIG. 1. Said reference is intended to be non-limiting and is used herein merely to describe relationship between various components as illustrated in FIG. 1.

Although a particular example of an architectural-structure covering 100 is shown in FIG. 1, many different types and styles of architectural-structure coverings exist and can be employed in place of the example illustrated in FIG. 1. As such, it should be understood that features of the present disclosure may be used in combination with any suitable architectural-structure covering now known or hereafter developed and thus features of the present disclosure should not be limited to any particular type of architectural-structure covering. For example, it should be appreciated that the coverings 120, 220 may be any suitable coverings now known or hereafter developed. In addition, the various features described herein may be used separately or jointly in any combination. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art. As such, the present disclosure should not be limited to the specific illustrations and details described herein unless specifically claimed.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

As used herein, an element or step recited in the singular and proceeded with the word "a" or "an" should be understood as not excluding plural elements or steps, unless such exclusion is explicitly recited.

The phrases "at least one", "one or more", and "and/or", as used herein, are open-ended expressions that are both conjunctive and disjunctive in operation. The terms "a" (or "an"), "one or more" and "at least one" can be used interchangeably herein. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

What is claimed:

1. An architectural-structure covering comprising:

a headrail;

a first covering movable in a first direction between an extended position and a retracted position;

a second, reflective covering movable in the first direction between an extended position and a retracted position; and a light source positioned within the headrail;

a reflector positioned within the headrail, the reflector arranged and configured to receive light from the light source and to direct the received light towards the second, reflective covering to illuminate an exposed portion of the second, reflective covering;

wherein the light source extends in a second direction orientated perpendicularly relative to the first direction.

2. The architectural-structure covering of claim 1, further comprising:

a first rotatable member operatively coupled to the first covering, the first rotatable member being at least partially positioned with the headrail; and a second rotatable member operatively coupled to the second covering, the second rotatable member being at least partially positioned with the headrail.

3. The architectural-structure covering of claim 1, wherein the first and second coverings are separately and independently movable between their respective extended and retracted positions so that a position of the first and second coverings are separately and independently positionable.

4. The architectural-structure covering of claim 1, wherein the first and second coverings are arranged and configured to move in unison.

5. The architectural-structure covering of claim 1, wherein the first and second coverings are arranged and configured to extend and retract simultaneously.

6. The architectural-structure covering of claim 1, wherein the first and second coverings are arranged and configured to extend to an identical position.

7. The architectural-structure covering of claim 1, wherein the light source includes an array of light-emitting diodes.

8. The architectural-structure covering of claim 1, wherein the light source extends across a length of the second, reflective covering.

9. The architectural-structure covering of claim 1, wherein the second, reflective covering is arranged and configured to distribute the emitted light toward an interior space of a room.

10. The architectural-structure covering of claim 1, wherein the architectural-structure covering is arranged and configured to distribute light across a cross-sectional area of an exposed portion of the second, reflective covering.

11. The architectural-structure covering of claim 1, wherein, when the second, reflective covering is partially extended, the light source is arranged and configured to illuminate only the partially extended portion of the second, reflective covering.

12. The architectural-structure covering of claim 1, wherein the light source is coupled to the reflector.

13. The architectural-structure covering of claim 12, wherein the reflector includes a reflective surface positioned adjacent to the light source for directing the received light towards the second, reflective covering.

14. An architectural-structure covering comprising:

a headrail;

a first covering movable in a first direction between an extended position and a retracted position;

a second, reflective covering movable in the first direction between an extended position and a retracted position; and a light source positioned within the headrail;

a reflector positioned within the headrail, the light source being coupled to the reflector, the reflector including a reflective surface positioned adjacent to the light source for receiving light from the light source and to direct the received light towards the second, reflective covering to illuminate an exposed portion of the second, reflective covering;

wherein the light source extends in a second direction orientated perpendicularly relative to the first direction.

15. The architectural-structure covering of claim 14, further comprising:

a first rotatable member operatively coupled to the first covering, the first rotatable member being at least partially positioned with the headrail; and a second rotatable member operatively coupled to the second covering, the second rotatable member being at least partially positioned with the headrail.

16. The architectural-structure covering of claim 14, wherein the first and second coverings are separately and independently movable between their respective extended and retracted positions so that a position of the first and second coverings are separately and independently positionable.

17. The architectural-structure covering of claim 14, wherein the light source extends across a length of the second, reflective covering.

18. The architectural-structure covering of claim 14, wherein the second, reflective covering is arranged and configured to distribute the emitted light toward an interior space of a room.

19. The architectural-structure covering of claim 14, wherein the architectural-structure covering is arranged and configured to distribute light across a cross-sectional area of an exposed portion of the second, reflective covering.

20. The architectural-structure covering of claim 14, wherein, when the second, reflective covering is partially extended, the light source is arranged and configured to illuminate only the partially extended portion of the second, reflective covering.

* * * * *